US010766325B2

(12) United States Patent
Rarey et al.

(10) Patent No.: US 10,766,325 B2
(45) Date of Patent: Sep. 8, 2020

(54) VEHICLE SUSPENSION

(71) Applicant: Hendrickson USA, L.L.C., Itasca, IL (US)

(72) Inventors: Andrew X. Rarey, Plainfield, IL (US); Shawn D. Noble, Naperville, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 178 days.

(21) Appl. No.: 15/432,344

(22) Filed: Feb. 14, 2017

(65) Prior Publication Data
US 2017/0158011 A1 Jun. 8, 2017

Related U.S. Application Data

(63) Continuation of application No. 29/574,562, filed on Aug. 16, 2016, now Pat. No. Des. 821,929, and a
(Continued)

(51) Int. Cl.
*B60G 5/02* (2006.01)
*B60G 11/22* (2006.01)

(52) U.S. Cl.
CPC ............... *B60G 5/02* (2013.01); *B60G 11/22* (2013.01); *B60G 2200/318* (2013.01); *B60G 2202/143* (2013.01); *B60G 2202/1422* (2013.01); *B60G 2204/125* (2013.01); *B60G 2204/143* (2013.01); *B60G 2204/1482* (2013.01);
(Continued)

(58) Field of Classification Search
CPC .. B60G 5/02; B60G 11/22; B60G 2202/1422; B60G 2204/4302; B60G 2204/125; B60G 2206/722; B60G 2204/4502; B60G 2300/0262; B60G 2300/02;
(Continued)

(56) References Cited

U.S. PATENT DOCUMENTS 4,000,914 A 1/1977 Wragg
5,676,352 A * 10/1997 Mayer ................. B60B 17/0017
267/140.4
(Continued)

FOREIGN PATENT DOCUMENTS

GB 648516 A 1/1951
GB 720365 A 12/1954
(Continued)

OTHER PUBLICATIONS

Hendrickson, Haulmaxx, Technical Procedure, Service Instructions, Lit. No. 17730-244, Dec. 2007, Rev. C, 48 pages.
(Continued)

*Primary Examiner* — Paul N Dickson
*Assistant Examiner* — Joselynn Y Sliteris
(74) *Attorney, Agent, or Firm* — McDonnell Boehnen Hulbert & Berghoff LLP

(57) ABSTRACT

A bolster spring for a vehicle suspension including a base plate, a top plate, elastomeric material positioned between the base plate and the top plate, a first flange comprising a pair of ears having a bottom mounting surface upwardly extending from a first end of the base plate at an angle ½α, and one or more mounting holes positioned in the pair of ears in the first flange adapted for attachment to a pair of ears on an upwardly extending flange on a second bolster spring.

11 Claims, 27 Drawing Sheets

Related U.S. Application Data continuation-in-part of application No. 14/500,106, filed on Sep. 29, 2014, now Pat. No. 9,604,517.

(52) U.S. Cl.
CPC .............. *B60G 2204/4302* (2013.01); *B60G 2204/4502* (2013.01); *B60G 2206/722* (2013.01); *B60G 2300/02* (2013.01); *B60G 2300/0262* (2013.01)

(58) Field of Classification Search
CPC ...... B60G 2204/143; B60G 2204/1482; B60G 2200/318; B60G 2202/143
See application file for complete search history.

(56) References Cited

U.S. PATENT DOCUMENTS

| | | |
|---|---|---|
| 6,585,286 B2 | 7/2003 | Adema et al. |
| D605,984 S | 12/2009 | Noble et al. |
| D610,952 S | 3/2010 | Noble et al. |
| 8,152,195 B2 | 4/2012 | Noble et al. |
| D677,607 S | 3/2013 | Moriyama et al. |
| D699,637 S | 2/2014 | Noble |
| 8,720,937 B2 | 5/2014 | Noble et al. |
| 9,004,512 B2 | 4/2015 | Noble et al. |
| D763,742 S | 8/2016 | Noble |
| 2008/0030006 A1 | 2/2008 | Sellers |
| 2016/0089942 A1 | 5/2016 | Noble et al. |

FOREIGN PATENT DOCUMENTS

| | | |
|---|---|---|
| GB | 2069424 | 8/1981 |
| GB | 2252276 | 8/1992 |
| WO | 2016/053360 A1 | 4/2016 |

OTHER PUBLICATIONS

Hendrickson, HN Series, VariRate Spring System, Lit. No. 45745-087, Rev. K, Apr. 2014, 3 pages.
International Searching Authority, International Search Report and Written Opinion for PCT/US2014/060704 dated May 11, 2015, 10 pages.
Hendrickson "Range of Global Suspensions Broadened" Sep. 2014, pp. 1-3.
Hendrickson "Global Haulmaax Introduced" Sep. 2014, pp. 1-3.
Hendrickson "Haulmaxx Suspension Features and Benefits brochure" (2014), pp. 1-2.
Hendrickson "Tradeshow Photograph" Sep. 2014, p. 1.
Hendrickson "Second Tradeshow Photograph" Sep. 2014, p. 1.
International Searching Authority, International Search Report and Written Opinion for PCT/US2017/049266 dated Nov. 16, 2017, 19 pages.
The International Preliminary Report on Patentability (IPRP) for PCT/US2017/049266 dated Aug. 20, 2019, pp. 1-11.

\* cited by examiner

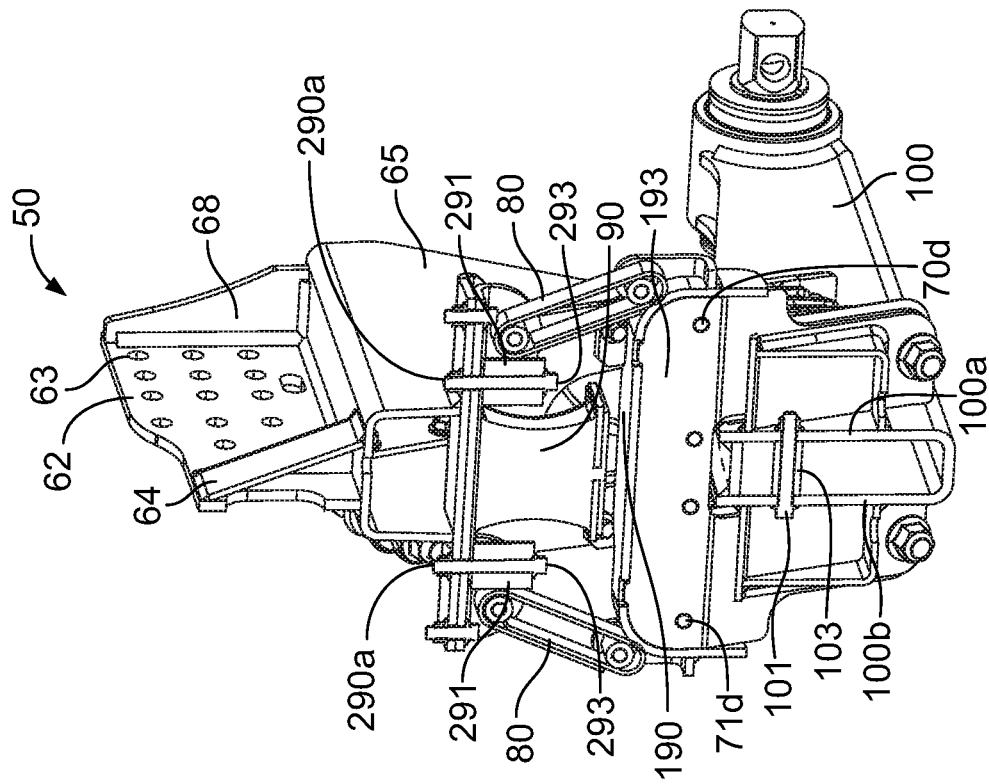
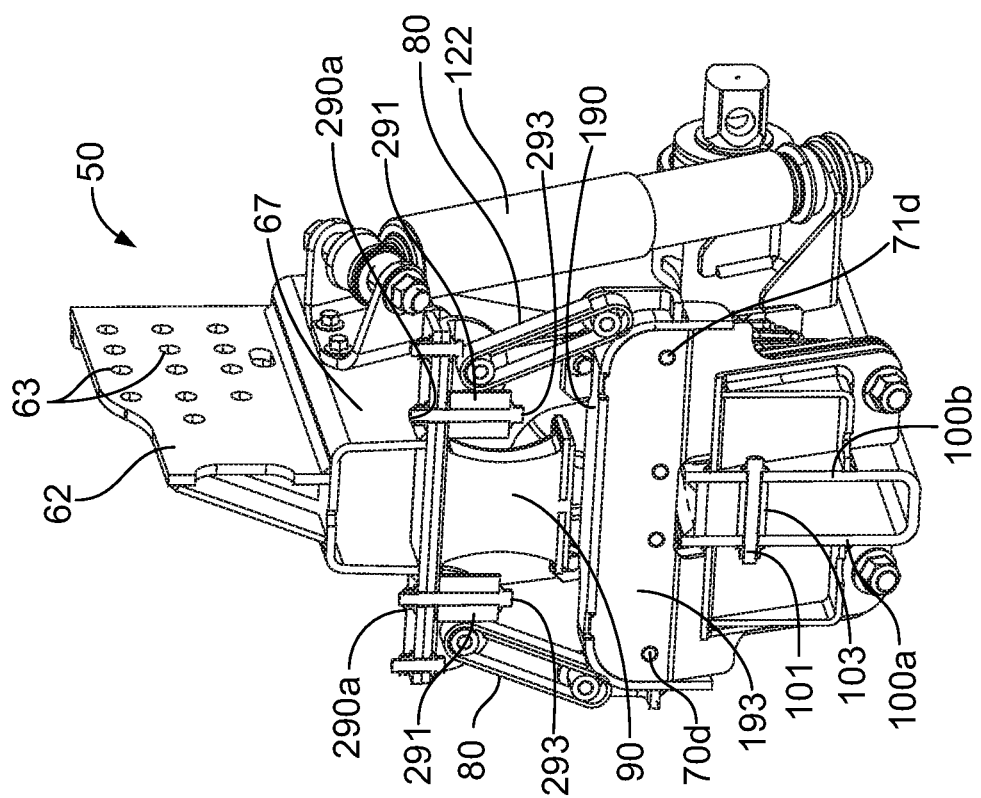

VEHICLE SUSPENSION

BACKGROUND

The present invention generally relates to vehicle suspensions. More particularly, the present invention relates to vehicle suspensions using bolster springs. Examples of vehicle suspensions having bolster springs are disclosed in U.S. Pat. No. 6,585,286 entitled "Vehicle Suspension" that issued on Jul. 1, 2003, herein incorporated by reference in its entirety. This application also claims priority to U.S. patent application Ser. No. 29/574,562 filed on Aug. 16, 2016, the contents of which are herein incorporated by reference in its entirety. The present application includes improvements and advancements over the vehicle suspensions disclosed in the '286 patent noted above.

SUMMARY

A vehicle suspension is provided having a frame attachment portion attached to a saddle, first and second bolster springs mounted to spring mounts on an outboard side of the saddle and mounted on walls of a spring mount on an outboard side of an equalizing beam, and third and fourth bolster springs mounted to walls of a spring mount on an inboard side of the saddle and mounted to spring mounts on an inboard side of the equalizing beam. Upwardly extending flanges including a pair of ears is provided on the bottom of the first and second bolster springs that are mounted to each other with common fasteners, and wherein upwardly extending flanges on the bottom of the third and fourth bolster springs are mounted to each other with common fasteners. The mechanical joints provide retention integrity allowing for the use of fewer and smaller fasteners resulting in a lighter, more optimized design. In addition, an apex angle between the bolster springs has been reduced allowing them to operate more in shear thereby providing for a decrease in the primary and secondary suspension spring rates, as well as reduced axle translation during braking and acceleration. In addition, the reduced apex angle and direct mounting of the bolster springs provides for additional clearance for vehicle tires.

In one aspect, a bolster spring for a vehicle suspension is provided including a base plate, a top plate, elastomeric material positioned between the base plate and the top plate, a first flange comprising a pair of ears having a bottom mounting surface upwardly extending from a first end of the base plate at an angle ½α, and one or more mounting holes positioned in the pair of ears in the first flange adapted for attachment to a pair of ears on an upwardly extending flange on a second bolster spring.

In another aspect, a bolster spring for a vehicle suspension is provided including a base plate, a top plate, elastomeric material positioned between the base plate and the top plate, a first flange having a bottom mounting surface upwardly extending from a first end of the base plate at an angle ½α, and a tie-bar mounting flange rearwardly extending from an end of an intermediate plate positioned between the base plate and the top plate.

In a further aspect, a suspension subassembly is provided including a first bolster spring that comprises a base plate, a top plate, elastomeric material positioned between the base plate and the top plate, a first flange comprising a pair of ears having a bottom mounting surface upwardly extending from a first end of the base plate at an angle ½α, one or more mounting holes positioned in the pair of ears in the first flange adapted for attachment to a pair of ears on an upwardly extending flange on a second bolster spring, the second bolster spring including a base plate, a top plate, elastomeric material positioned between the base plate and the top plate, a first flange comprising a pair of ears having a bottom mounting surface upwardly extending from a first end of the base plate at an angle ½α, and one or more mounting holes positioned in the pair of ears in the first flange adapted for attachment to the pair of ears on the upwardly extending flange on the first bolster spring.

BRIEF DESCRIPTION OF THE DRAWINGS

Exemplary embodiments of the invention are described herein with reference to the drawings, wherein like parts are designated by like reference numerals, and wherein:

FIG. 22A is a cross-sectional, perspective view of the inboard side of vehicle suspension 50, taken along line 22A-22A in FIG. 4;

FIG. 22B is a cross-sectional, perspective view of the outboard of vehicle suspension 50, taken along line 22B-22B in FIG. 2;

DETAILED DESCRIPTION OF THE INVENTION

FIGS. 1A-10 provide various views of vehicle suspension 50. Vehicle suspension 50 is designed to support longitudinally extending vehicle frame rails (not shown) which can be of various types that are positioned above laterally extending vehicle axles. As will be appreciated by those skilled in the art, components of vehicle suspension 50 are duplicated on each side of the vehicle as shown in FIG. 1B. It will also be appreciated that vehicle wheels may be mounted to the ends of the vehicle axles in a known manner. Further, it will be appreciated that the vehicle frame rails may be connected by one or more vehicle frame cross members.

Those skilled in the art will further understand that a suspension, arranged in accordance with the suspension 50 and the components thereof, alternatively may be attached to frame rails of a trailer (for example, a trailer that connects to a semi-tractor). The frame rails of a trailer may comprise frame rails such as those described above or another type of frame rail.

For purposes of this description, unless specifically described otherwise, hereinafter, "vehicle" refers to a vehicle or a trailer. In this way, for example, a vehicle frame refers to a vehicle frame or a trailer frame. Furthermore, for purposes of this description, the left side of a vehicle refers to a side of the vehicle on an observer's left-hand side when the observer faces the back of the vehicle, and the right side of the vehicle refers to a side of the vehicle on an observer's right-hand side when the observer faces the back of the vehicle. Furthermore still, for purposes of this description, "outboard" refers to a position further away from a center line, running from the front to the back of a vehicle, relative to "inboard" which refers to a position closer to that same center line.

Figure 1A:
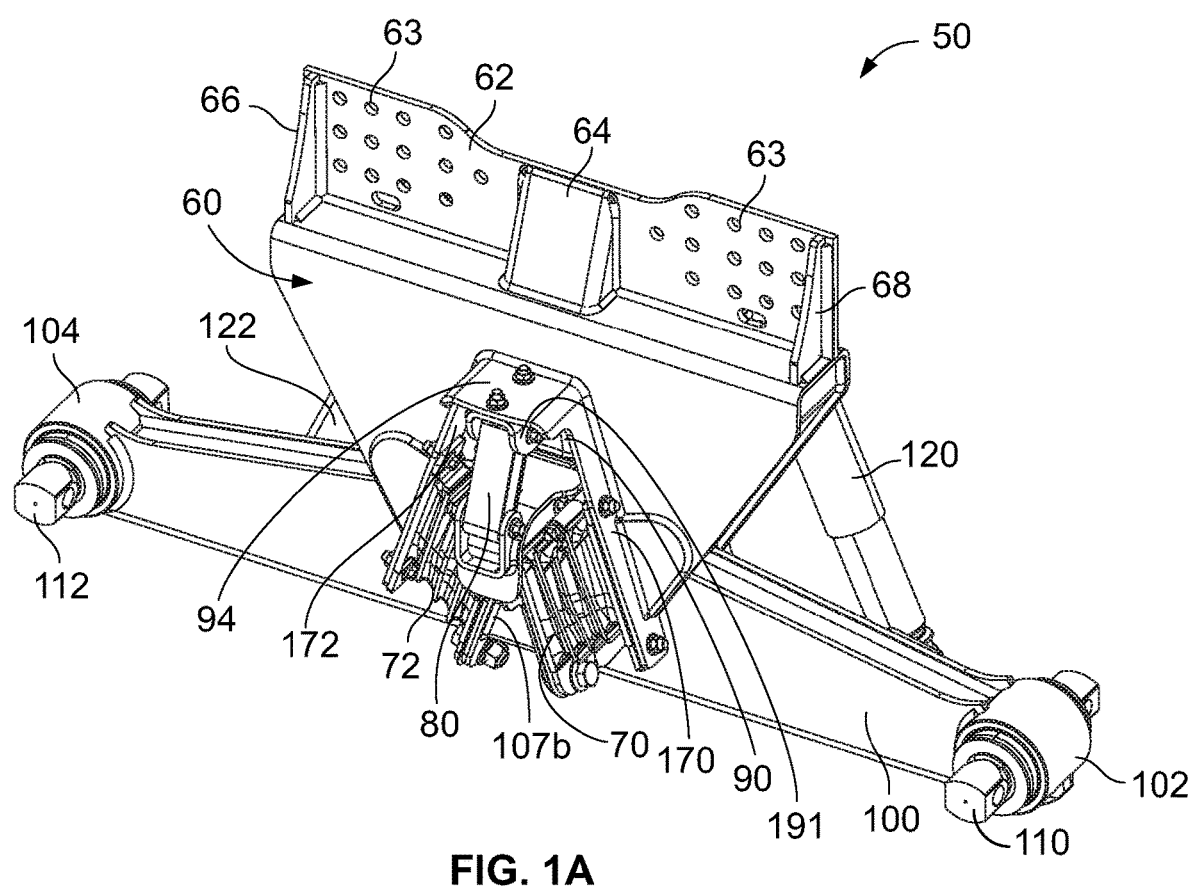
FIG. 1A is a perspective view of the outboard side of vehicle suspension 50, according to an example embodiment.

FIG. 1A is a perspective view of an outboard side of vehicle suspension 50 having a frame attachment portion 62 that is adapted for attachment to a vehicle frame or frame rail with a plurality of mounting holes 63. Frame attachment portion 62 includes outer gussets 66 and 68 and central flange 64 that provide additional strength and rigidity to the vehicle suspension 50. Frame attachment portion 62 is attached to saddle 60. Bolster springs 70 and 72 are provided that each have a top attached bolster spring mounts 170 and 172 extending from an outboard side of saddle 60 and a bottom attached to walls of bolster spring mount 107b positioned on equalizing beam 100. Equalizing beam 100 has a beam hub 102 on a first end and a beam hub 104 on a second end. Beam hub 102 includes a bar pin 110 adapted for attachment to a first axle (not shown) and beam hub 104 includes a bar pin 112 adapted for attachment to a second axle (not shown).

A pair of shock absorbers 120 and 122 each have one end mounted to the equalizing beam 100 and another end mounted to saddle 60 on the inboard side of vehicle suspension 50. In some applications, shock absorbers may not be used. A load cushion 90 is mounted to load cushion mount 94 extending from saddle 60 and load cushion 90 is positioned beneath saddle 60 and positioned inwardly from and generally above bolster springs 70 and 72. A first rebound strap 80 is mounted to load cushion mount 94, and a second rebound strap is mounted to load cushion mount 92 (shown in FIG. 3). A bracket 191 having U-shaped ends that are used to mount rebound straps 80 may be positioned between the load cushion and the load cushion mounts 92 and 94. In addition, shims of varying thickness may positioned between the load cushion 90 and bracket 191 to change the ride characteristics of the vehicle suspension 50.

Figure 1B:
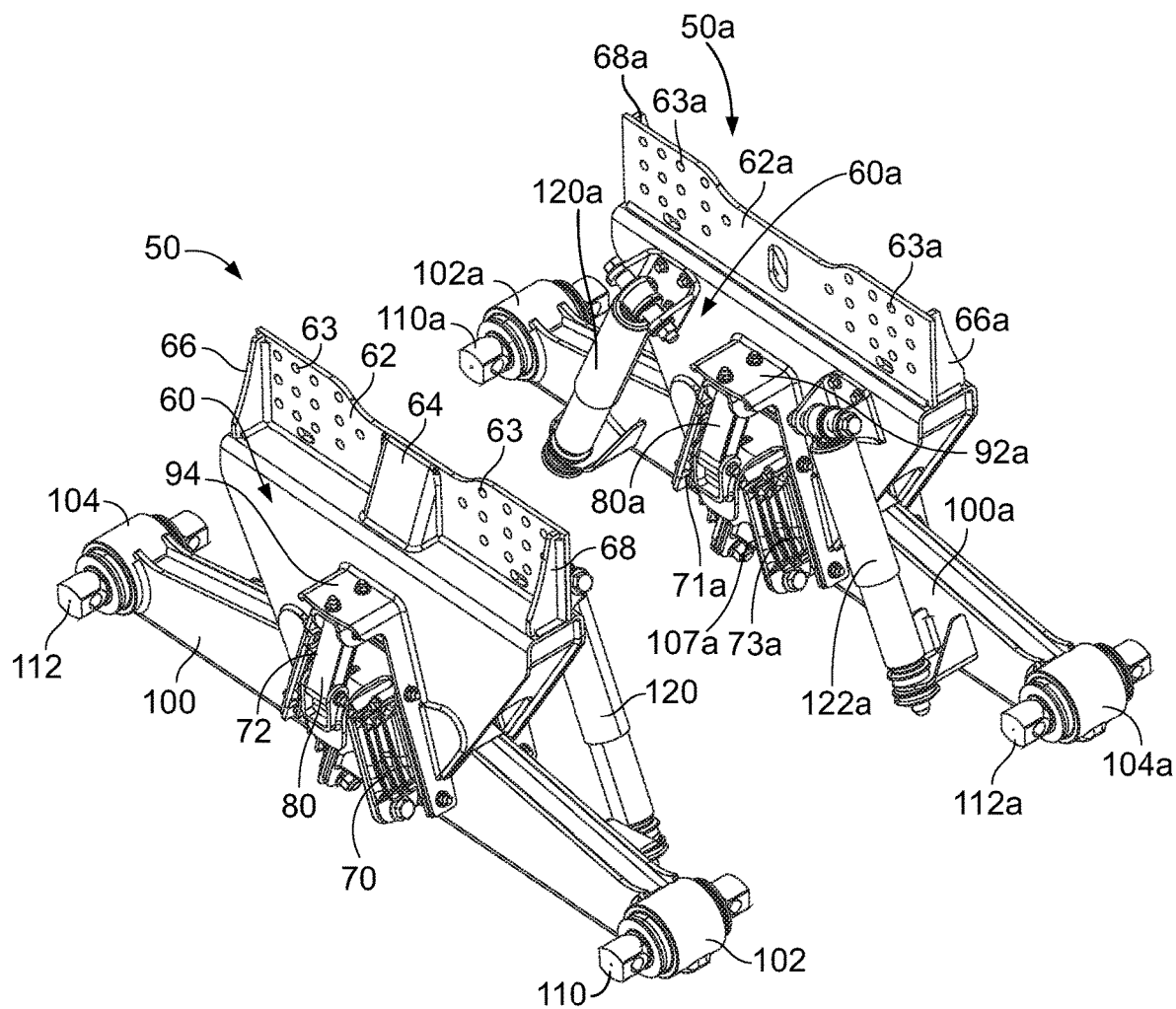
FIG. 1B is a perspective view of vehicle suspension 50 shown in FIG. 1 and oppositely disposed vehicle suspension 50.

FIG. 1B includes a second vehicle suspension 50a that is a mirror image of vehicle suspension 50, and may be positioned on an opposite side of a vehicle frame. Accordingly, FIG. 1B provides a perspective view of the inboard side of vehicle suspension 50a. Vehicle suspension 50a includes a frame attachment portion 62a that is adapted for attachment to a vehicle frame or frame rail with a plurality of mounting holes 63a. Frame attachment portion 62a further includes outer gussets 66a and 68a that along with a central flange provide additional strength and rigidity to the vehicle suspension 50a. Frame attachment portion 62a is attached to saddle 60a. Bolster springs 71a and 73a are provided that each have a top attached to bolster spring mounts extending from the inboard side of saddle 60a and a bottom attached to bolster spring mount 107a positioned on equalizing beam 100a. Equalizing beam 100a has a beam hub 102a on a first end and a beam hub 104a on a second end. Beam hub 102a includes a bar pin 110a adapted for attachment to a second axle (not shown) and beam hub 104a includes a bar pin 112a adapted for attachment to a first axle (not shown).

A pair of shock absorbers 120a and 122a each have one end mounted to the inboard side of equalizing beam 100a and another end mounted to the inboard side of saddle 60a. A load cushion is mounted to load cushion mount 92a extending from saddle 60a. A rebound strap 80a is mounted to load cushion mount 92a.

Figure 2:
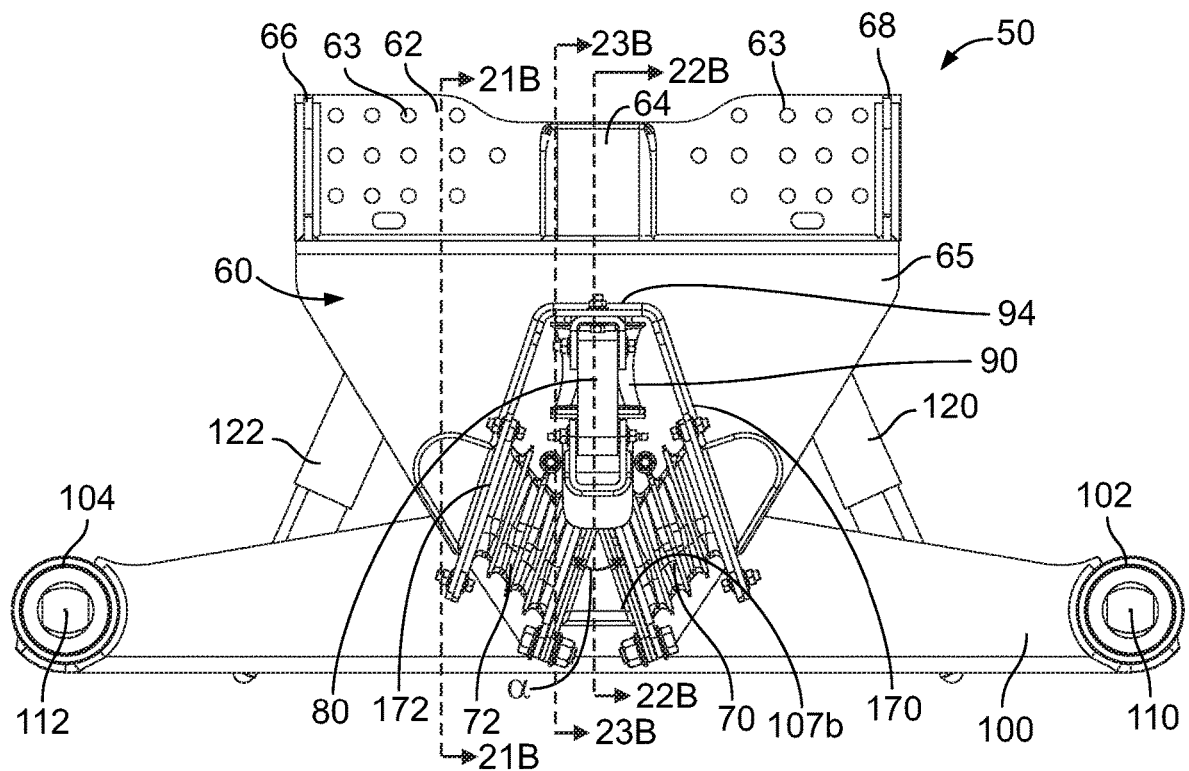
FIG. 2 is a front view of the outboard side of vehicle suspension 50 shown in FIGS. 1A and 1B.
Figure 3:
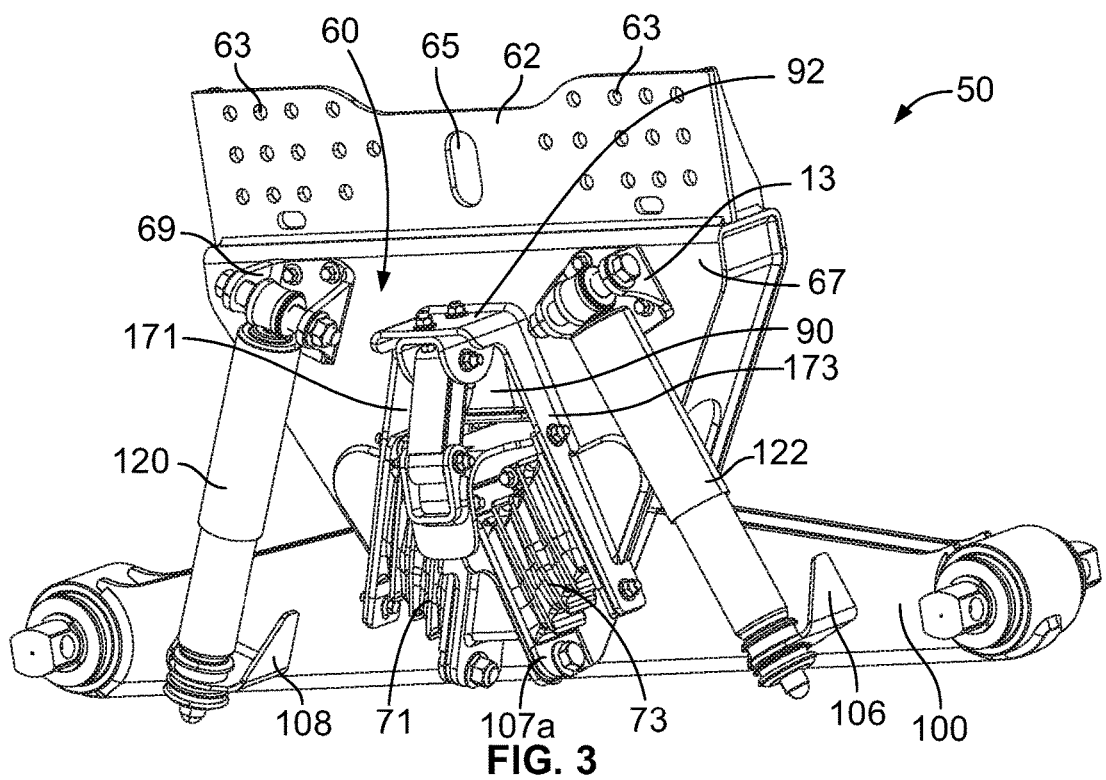
FIG. 3 is a perspective view of the inboard side of vehicle suspension 50 shown in FIGS. 1A, 1B, and 2.
Figure 4:
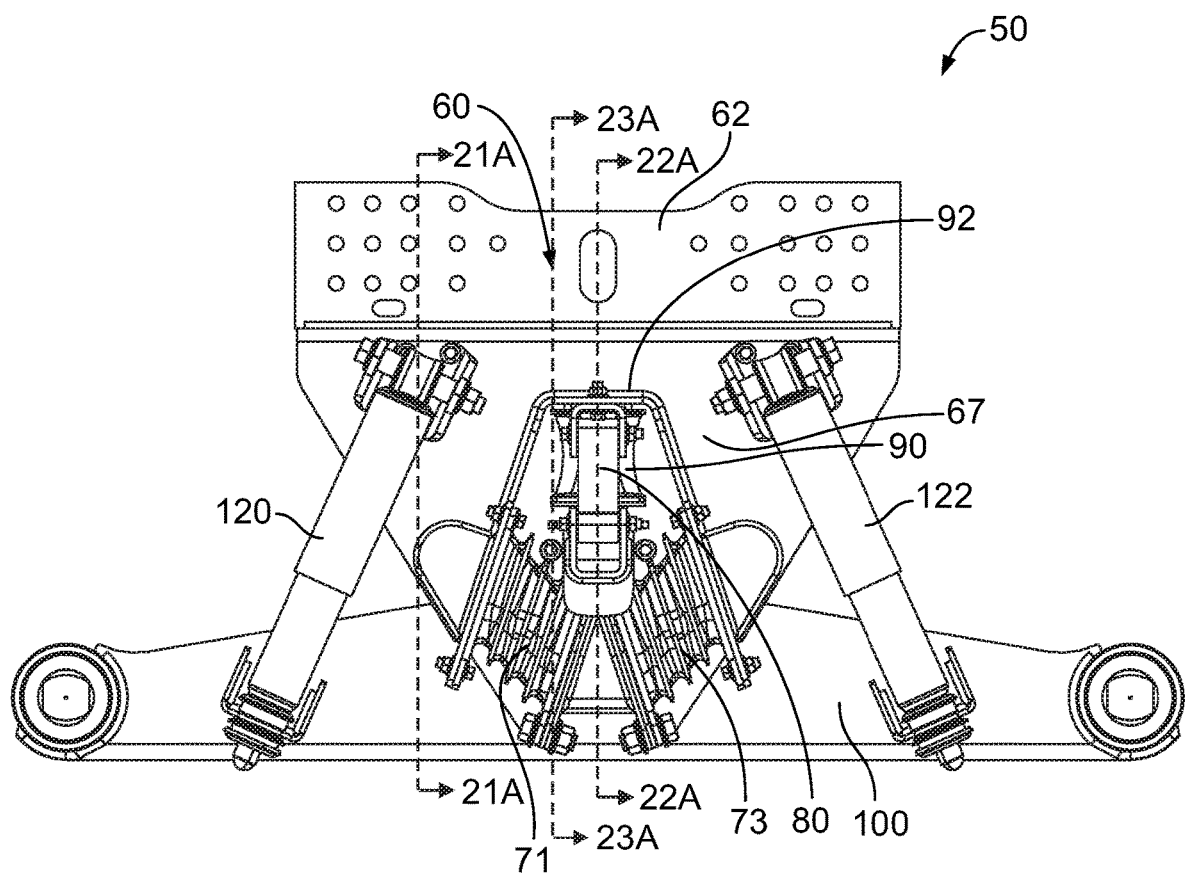
FIG. 4 is a rear view of the inboard side of vehicle suspension 50 shown in FIGS. 2 and 3.

FIG. 2 provides a front view of the outboard side of vehicle suspension 50 and FIGS. 3 and 4 provide views of the inboard side of vehicle suspension 50. In FIG. 2, load cushion 90 is shown mounted to load cushion mount 94 extending from saddle 60. Bolster springs 70 and 72 are mounted to bolster springs mounts 170 and 172 outwardly extending from outboard wall 65 of saddle 60, and also to bolster spring mount 107b on the outboard side of the equalizing beam 100. As shown in FIG. 3, bolster springs 71 and 73 are mounted to bolster spring mounts 171 and 173 extending from inboard wall 67 of saddle 60 and to walls of bolster spring mount 107a positioned on the inboard side of the equalizing beam 100. The configuration of bolster springs 70-73 results in a balanced, split bolster spring arrangement where one pair of bolster springs 70 and 72 is positioned on the outboard side of equalizing beam 100 and one pair of bolster springs 71 and 73 is positioned on the inboard side of equalizing beam 100.

As shown in FIG. 3, shock absorber 120 has a first end secured to mount 108 positioned on equaling beam 100 and a second end secured to mount 69 positioned on saddle 60, and shock absorber 122 has a first end secured to mount 106 positioned on equalizing beam 100 and a second end secured to mount 13 positioned on saddle 60. In other embodiments, the second ends of shock absorbers 120 and 122 could also be mounted to a vehicle frame or frame rail, or not used at all.

Prior vehicle suspensions employing bolster springs typically provided an acute angle, or apex angle, between the bottoms of the bolster springs of 53 degrees, which has become a de facto industry standard. However, as best shown in FIGS. 2 and 9, vehicle suspension 50 significantly departs from the de facto apex angle standard of 53 degrees. In particular, an apex angle $\alpha$ is provided that is significantly less than 53 degrees. In the embodiments shown in FIGS. 1-10, the apex angle $\alpha$ between the bottom of bolster springs 72 and 70 (and the apex angle between bolster springs 71 and 73) is 37 degrees. While an apex angle of 37 degrees is preferred, the apex angle $\alpha$ may range between 34-40 degrees, or from 30-45 degrees, all lower than a standard apex angle of 53 degrees.

By reducing the apex angle $\alpha$ to 37 degrees, a number of important advantages are achieved. For example, the reduced apex angle $\alpha$ allows the springs to be positioned closer together, and thereby taking up less space longitudinally. In turn, a greater clearance between the vehicle tires and the bolster spring arrangement is provided, which may provide greater tire chain clearance or allow for the use of larger tires. In addition, by reducing the apex angle $\alpha$, the bolster springs are put more into a shear, rather than compression. As a result, a lower primary vehicle spring rate may be achieved, while at the same time providing for increased longitudinal stiffness. The present configuration of the bolster springs with an apex angle $\alpha$ of 37 degrees has increased the longitudinal stiffness of the suspension resulting in a corresponding decrease in the longitudinal deflection to less than an inch. As a result, the reduced apex angle $\alpha$ has resulted in reduced axle translation along the SAE X-Axis during braking and acceleration.

Reducing the apex angle $\alpha$ between the bolster springs has advantageously resulted in a reduction in the primary suspension spring rate to 1.5-2.0 kN/mm depending upon the elastomer used to create the bolster springs. Furthermore, a secondary spring rate of the vehicle suspension when the load cushion is engaged measured at 1.0 g ranges from 2.0-3.5 kN/mm depending upon the elastomers chosen for both the bolster springs and initial gap between the load cushion and its reaction plate. These primary and second vehicle suspension spring rates are orders of magnitude lower than traditional elastomeric suspensions and are on the same order of magnitude as parabolic 6-rod suspensions.

Additionally, as discussed in more detail below with respect to FIG. 26, in addition to reducing the apex angle $\alpha$ between the bolster springs 70 and 72, and 71 and 73, vehicle suspension 50 also incorporates a unique bolster spring mounting arrangement wherein an angled flange 230 on the bottom plate 220 of bolster spring 70 is directly mounted to a corresponding angled flange 230 on bottom plate 220 of bolster spring 72 using a pair of common fasteners for retention. Bolster springs 71 and 73 are also directly mounted to each other using a pair of common fasteners in the same manner. As used herein, the term "directly mounted" means that the flanges are mounted together using a common fastener without a portion of the equalizing beam or bolster spring mount positioned therebetween, although a gasket or spacer, or portion of a spring saddle, could be positioned therebetween and the flanges would still be "directly mounted" to each other.

Directly mounting bolster springs 70 and 72 to each other, and directly mounting bolster springs 71 and 73 to each other using common fasteners provides a number of advantages. In particular, the bolster springs may be able to be positioned even closer together because there is no portion of the equalizing beam or a bolster spring mount extending between the flanges of the bolster springs. Furthermore, using common fasteners allows the positioning of the bolster springs to be closer together than if independent fasteners were used for each bolster spring. The closer positioning of the bolster springs allows even further clearance from the tires, again providing even greater clearance for tire chains or larger tires. The end result of directly mounting the flanges of the bolster springs with common fasteners provides for the use of fewer fasteners, faster assembly, improved clearances to surrounding components (because bolster springs are closer together), as well as the creation of a mechanical joint between the mounted flanges of the bolster springs.

As known to those skilled in the art, a mechanical joint formed between two components improves retention integrity and can permit the use of smaller fasteners compared to typical bolster spring designs. A benefit of smaller fasteners is improved clearances to surrounding packages, a more weight optimized design, and improved serviceability because smaller fasteners require less torque to achieve design load as a percent of proof load. Therefore, smaller fasteners are more easily and likely to be tightened appropriately.

Figure 5:
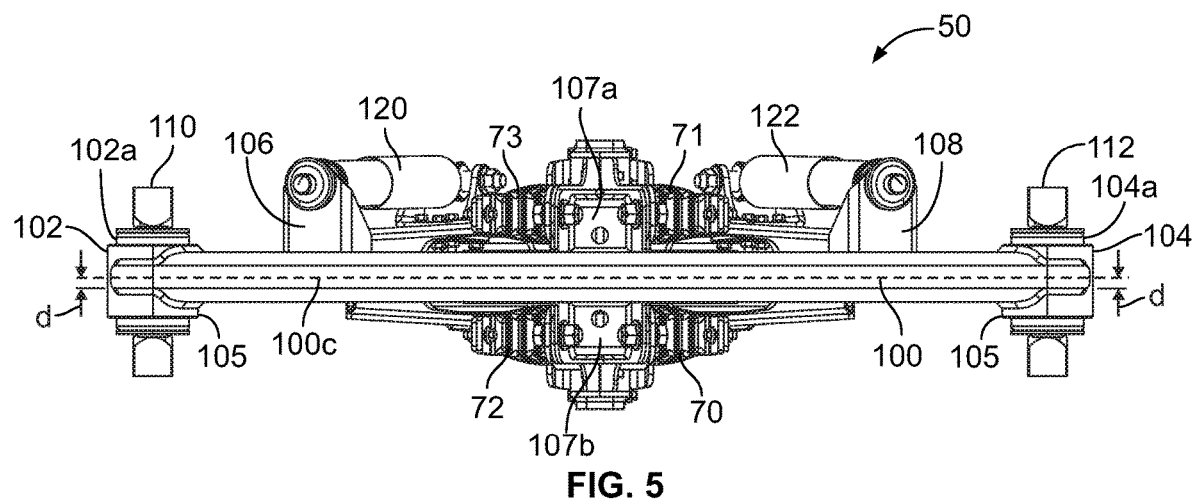
FIG. 5 is a bottom view of vehicle suspension 50 shown in FIGS. 1A-4.

FIG. 5 is a bottom view of vehicle suspension 50. From this view, the equalizing beam 100 is shown with beam hub 104 having inboard side 104a on one end with bar pin 112 and with beam hub 102 having inboard side 102a with bar pin 110. A center-plane 100c of equalizing beam 100 is shown offset towards inboard side 104a and inboard side 102a a distance d from a center-plane of beam hubs 104 and 102. In this embodiment, the center-plane is offset a distance d of 11 millimeters. Providing such an offset on the equalizing beam has the effect of moving the vehicle suspension towards the inboard side of the vehicle frame, thereby advantageously providing additional clearance on the outboard side of the vehicle suspension.

In FIG. 5, there is a clear view of bolster spring 70 and bolster spring 72 mounted to opposing walls of bolster spring mount 107b extending from an outboard side the vehicle suspension 50, as well as of bolster spring 71 and bolster spring 73 mounted to opposing walls of bolster spring mount 107a extending from the inboard side of vehicle suspension 50.

Figure 6:
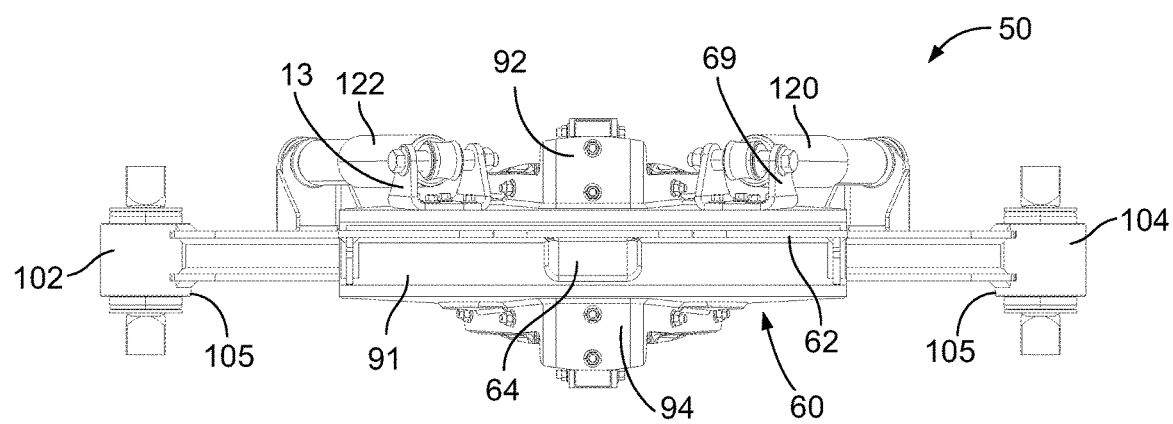
FIG. 6 is a top view of vehicle suspension 50 shown in FIGS. 1A-5.

FIG. 6 shows a top view of vehicle suspension 50. In FIGS. 5 and 6, shock absorbers 120 and 122 can be seen secured to the inboard side of saddle using shock absorber mounts 106, 108, 13, and 69. In addition, a gap 105 is shown on the surface of beam hubs 104 and 102 as a result of the offset d of center-plane 100c. In FIG. 6, load cushion mount 94 is shown extending from an outboard side of saddle 60 and load cushion mount 92 is shown extending from an inboard side of saddle 60. In addition, central flange 64 is shown positioned on top surface 91 of saddle 60 attached to frame attachment portion 62.

Figure 7:
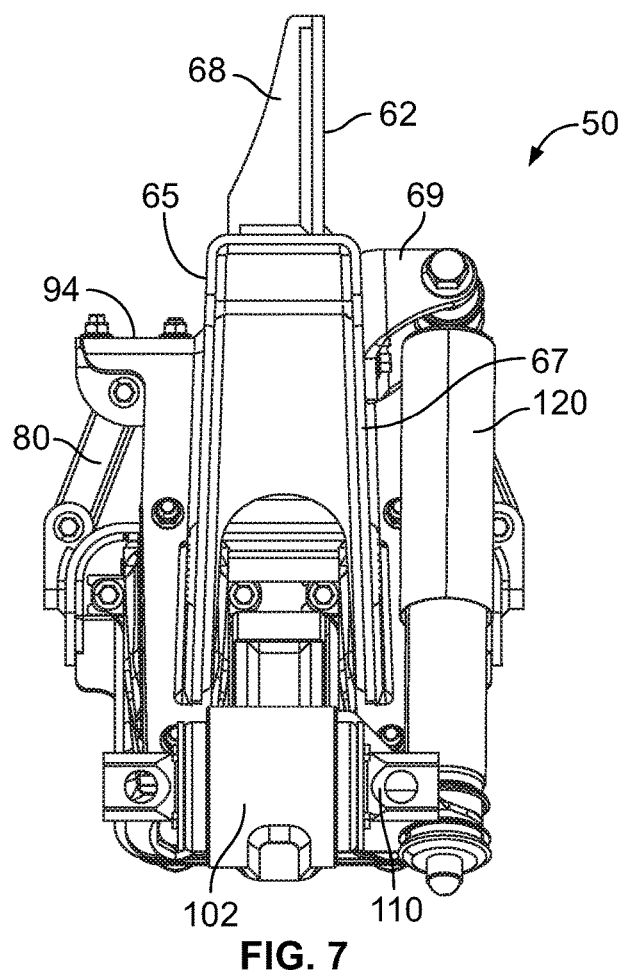
FIG. 7 is a right side view of vehicle suspension 50 shown in FIGS. 1A-6.
Figure 8:
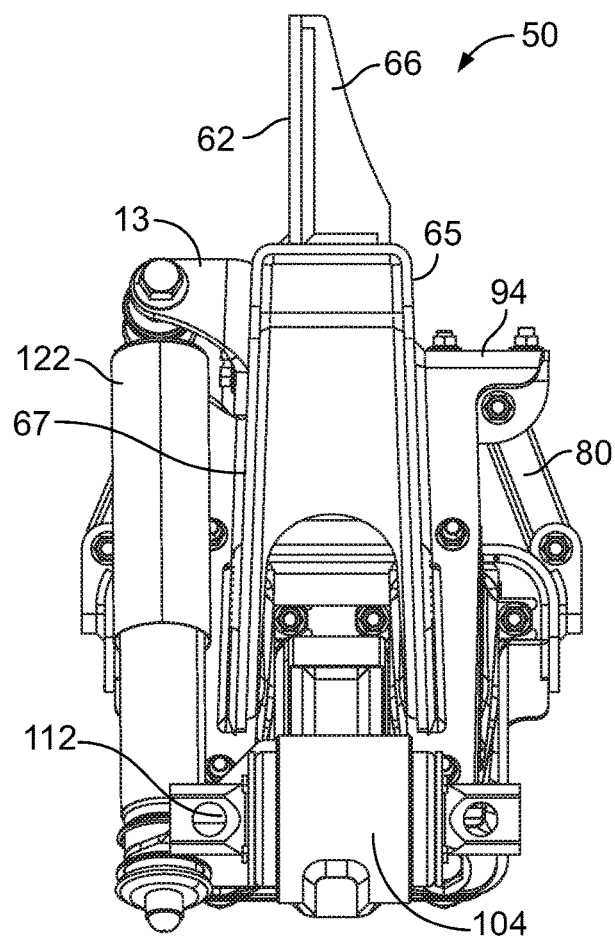
FIG. 8 is a left side view of vehicle suspension 50 shown in FIGS. 1A-7.
Figure 9:
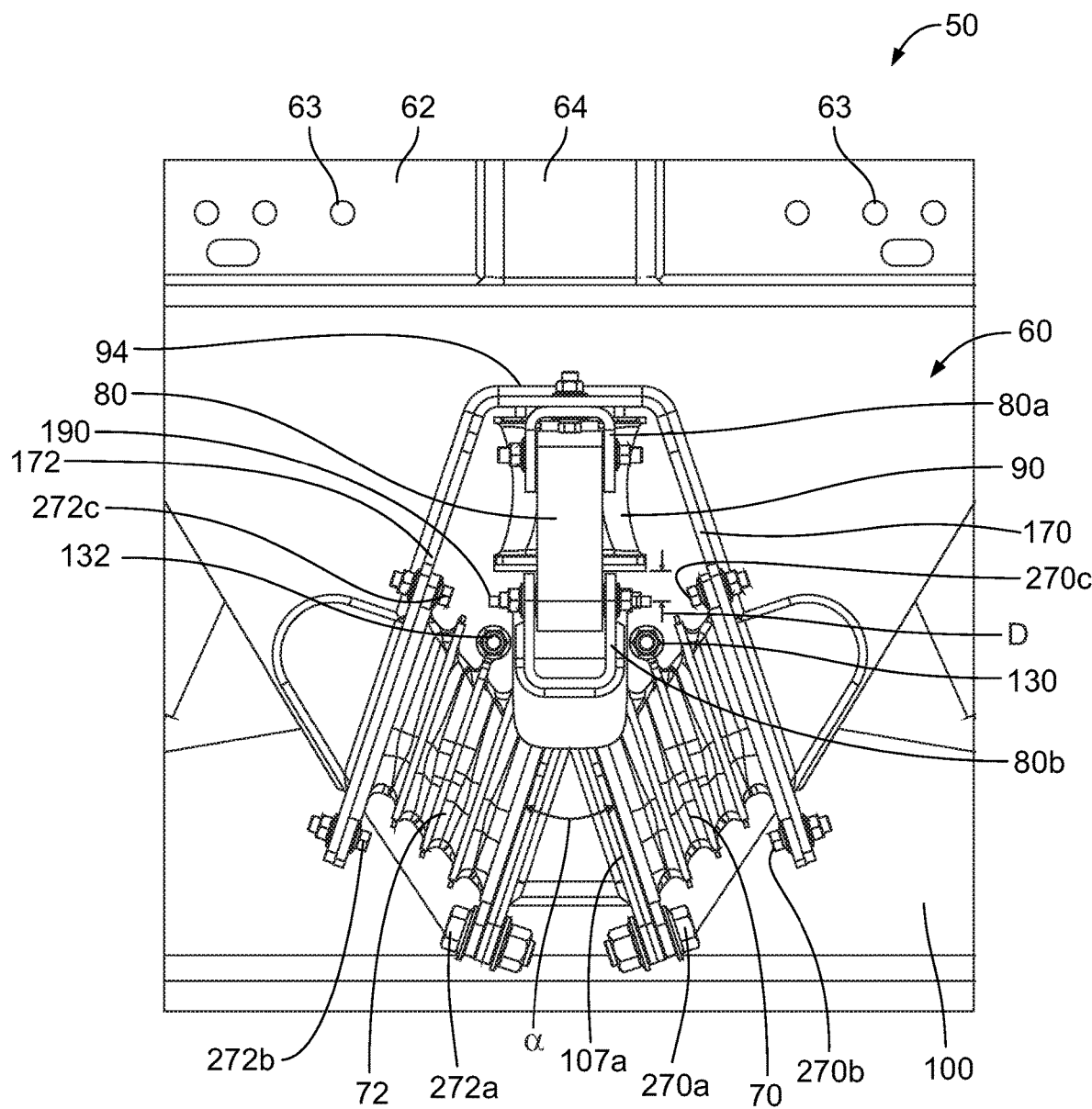
FIG. 9 is a close up front view of vehicle suspension 50 showing bolster springs 70 and 72, and load cushion 90.

FIG. 7 is a right side view of vehicle suspension 50 and FIG. 8 is a left side view of vehicle suspension 50. Beam hub 102 is shown with bar pin 110 adapted for attachment to a first axle (not shown) and beam hub 104 is shown with bar pin 112 adapted for attachment for a second axle (not shown). Frame attachment portion 62 with gussets 68 and 66 are shown extending above outboard wall 65 and inboard wall 67 of the saddle and load cushion mount 94 is shown extending from the outboard side of vehicle suspension 50. Shock absorber 122 is shown mounted to shock absorber mount 13 and shock absorber 120 is shown mounted to shock absorber mount 69. In addition, a pair of rebound straps 80 are shown extending from inboard and outboards sides of the vehicle suspension 50. Rebound straps 80 serve to prevent bolster springs 70-73 from being overstretched and overstressed when vehicle suspension 50 is placed in hang or rebound, such as when a vehicle is lifted with an outrigger, hits a large pothole, or during a sudden drop when going over a steep drop in the road.

Figure 10:
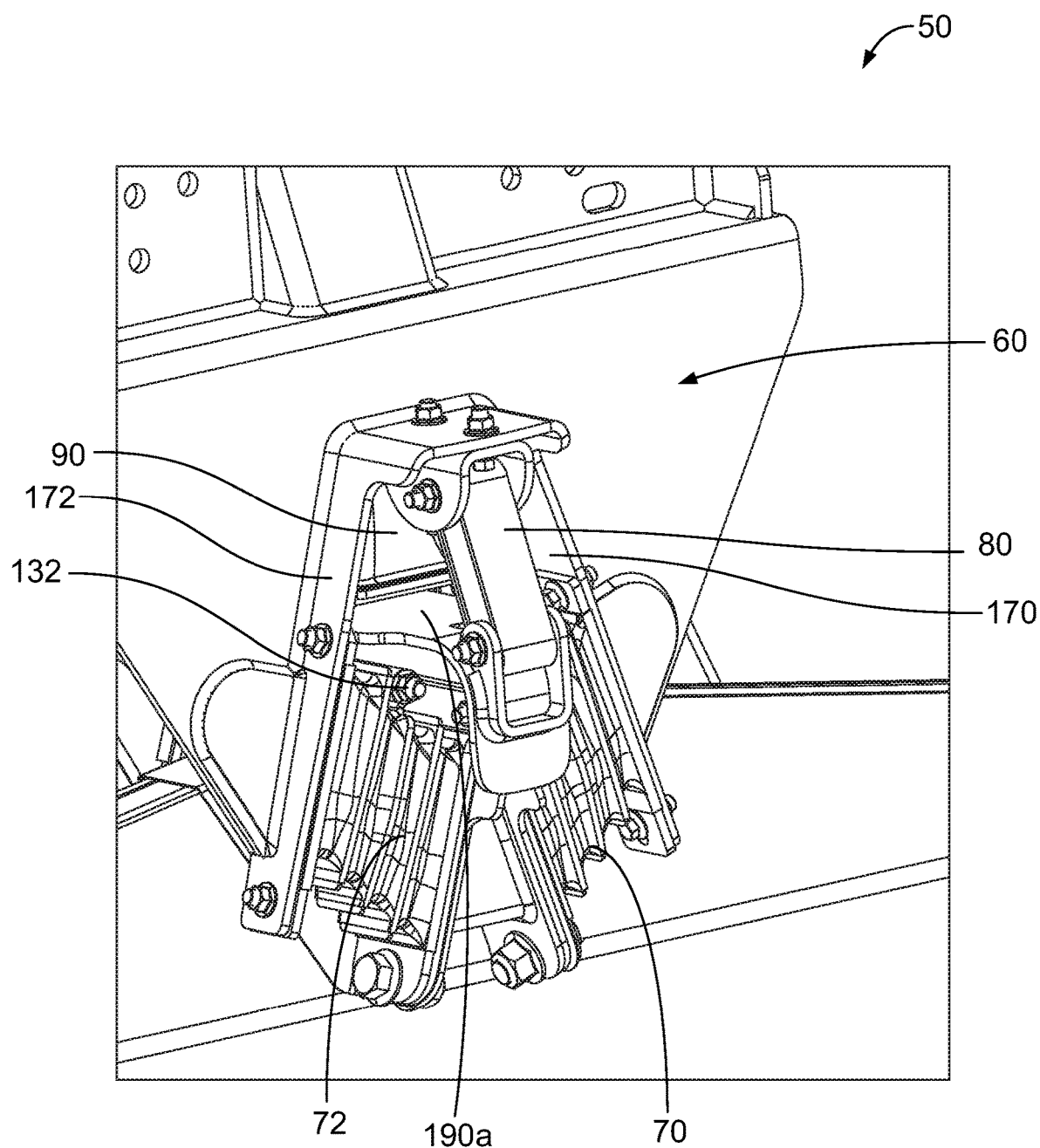
FIG. 10 is a close up front perspective view of vehicle suspension 50 shown in FIG. 9.
Figure 11:
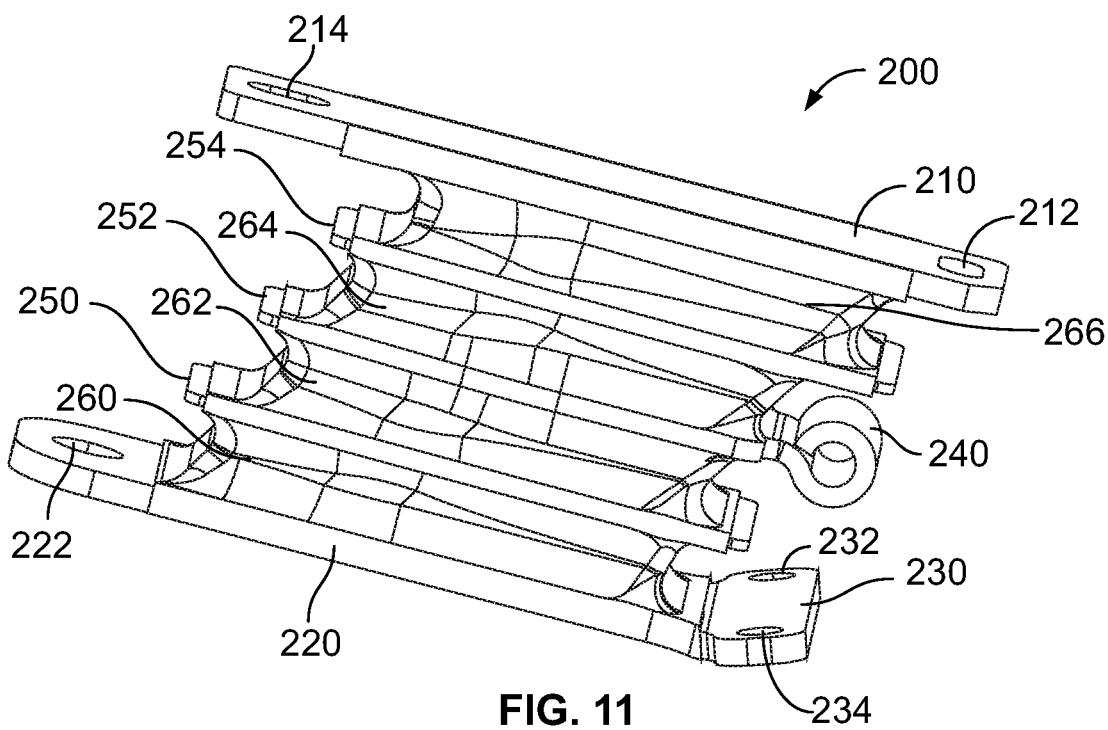
FIG. 11 is a perspective view of bolster spring 200, according to an example embodiment.
Figure 12:
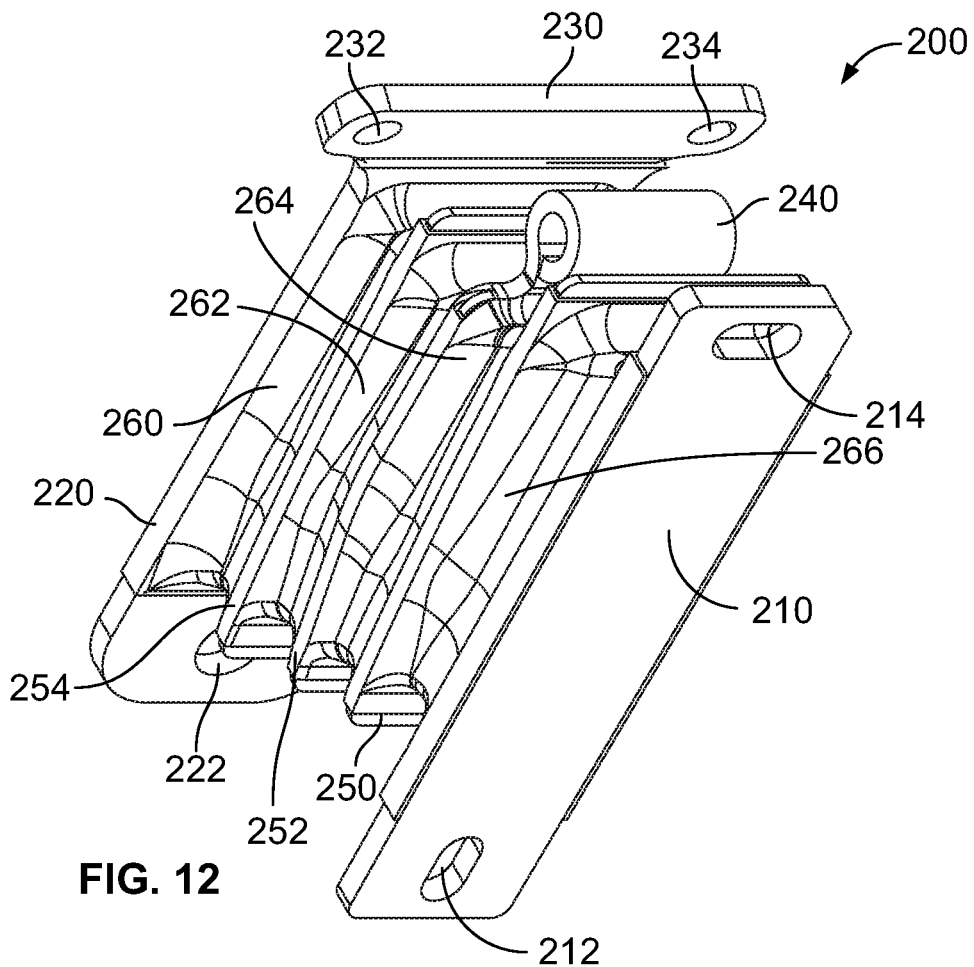
FIG. 12 is a perspective bottom view of bolster spring 200 shown in FIG. 11.

FIG. 9 is a close up front view of, and FIG. 10 is a close up perspective view of, the bolster springs 70 and 72 and load cushion 90 on the outboard side of vehicle suspension 50. Bolster spring 70 is attached to bolster spring mount 170 on saddle 60 using fasteners 270b and 270c, and also attached to bolster spring mount 107a on the equalizing beam 100 using fastener 270a. Similarly, bolster spring 72 is attached to bolster spring mount 172 on saddle 60 using fasteners 272b and 272c, and also attached to bolster spring mount 107a on the equalizing beam 100 using fastener 272a. As illustrated in FIG. 26, upwardly extending flange 230 of bolster spring 70 is directly mounted to a corresponding upwardly extending flange 230 of bolster spring 72 using common fasteners, with a portion of spring saddle 193 positioned therebetween. In other embodiments, the bolster springs flanges 230 may be directly mounted to each other using common fasteners without a portion of a spring saddle positioned between them. As discussed above, apex angle α is formed between the bottom plates of bolster springs 70 and 72.

To further strengthen the bolster spring assembly, a tie-bar 130 is used to tie outboard bolster spring 70 to inboard bolster spring 71 (shown in FIG. 3 and FIG. 5) and tie-bar 132 is used to tie inboard bolster spring 72 to inboard bolster spring 73 (shown in FIG. 3 and FIG. 5). In this embodiment, the tie-bar is mounted in an intermediate plate located at a midpoint between the top plate and bottom plate of the bolster spring. The midpoint is the point most susceptible to buckling, bulging, or splaying. Therefore, the tie-bar serves to react the inboard and outboard bolster springs to prevent buckling or bulging at the most vulnerable point on the bolster spring. The tie-bar therefore provides greater rigidity and strength to the bolster spring assembly.

Furthermore, by directly mounting bolster spring 70 to bolster spring 72 with common fasteners and directly mounting bolster spring 71 to bolster spring 73 with common fasteners, and by connecting bolster spring 70 to bolster spring 71 using tie-bar 130 and by connecting bolster spring 72 to bolster spring 73 using tie-bar 132, all four bolster springs 70, 71, 72, and 73 are interconnected. As a result, the present embodiments provide a unified, interconnected assembly of bolster springs that is more rigid and stable than if the bolster springs were not connected.

In addition, as shown in FIGS. 9 and 10, load cushion 90 is secured to outboard load cushion mount 94 (and to inboard load cushion mount 92 shown in FIG. 4), and is positioned above reaction plate 190. Rebound strap 80 is attached to rebound strap flange 80a and to rebound strap flange 80b. The reaction plate 190 is secured via attachment to rebound strap flange 80b. In this embodiment, a bottom surface of the load cushion 90 is positioned a distance D above the reaction plate 190. Distance D may preferably be 19 mm. Therefore, a primary spring rate is based on the bolster springs, and when the load cushion 90 engages the reaction plate 190, a secondary spring rate that includes the load cushion 90 is provided. In this embodiment, a hard stop has been included at 68 mm of travel to protect the bolster springs and load cushion from becoming overcompressed.

The hard stop feature is best shown in FIGS. 22A and 22B, where fasteners 290a used to mount the load cushion 90 downwardly extend towards the reaction plate 190. Sleeves 291 are positioned around the fasteners 290a and in this embodiment fasteners 290a have a head 293 extending from the end of sleeves 291. When load cushion 90 is significantly compressed, e.g. at 50% compression, the heads 293 of fasteners 290a that contact the reaction plate 190 to provide a hard stop and prevent further compression of the load cushion 90. In other embodiments, the bottom of sleeves 291 may be counterbored to enclose head 293 so that the head 293 does not extend from the bottom of the sleeve 291 and instead the bottom of the sleeve 291 contacts the reaction plate 190 to provide the hard stop. The bottom of the sleeve 291 has a greater surface area than head 293 of fasteners 290a to spread the forces upon impact with the reaction plate 190. As a result of the hard stop, there is a ceiling on the amount of strain that will experienced by the bolster springs and load cushion. In this embodiment, the rebound strap 80 is comprised of woven material that is advantageously removable to allow for easy repair or replacement of the rebound strap 80. It should be noted that depending upon the application, the disclosed vehicle suspensions may be used without a load cushion.

The components of the vehicle suspension 50 shown in FIGS. 1-10 may comprise cast or fabricated metal or composite material, including iron, steel, or aluminum. Frame attachment portion 62 and saddle 60, and equalizing beam 100 could also be cast with any suitable castable material. Similarly, the saddle 60 may comprise cast or fabricated metal or composite material. Depending on the application, the metal may, for example, be nodular ductile iron (or more simply, ductile iron), steel, such as a high strength low alloy steel, or aluminum. Typically, high strength low alloy steels are a preferred material to use for the frame hanger and the saddle, although aluminum is often desired when weight considerations are of greater importance.

FIGS. 11-15 are views of a bolster spring 200. Bolster springs 70, 71, 72, and 73 may be configured as bolster spring 200. As shown in FIGS. 11-14, bolster spring 200 includes a base plate 220 and a top plate 210. Bolster spring 200 includes an elastomeric section 260 between base plate 220 and intermediate plate 250, an elastomeric section 262 between intermediate plate 250 and intermediate plate 252, an elastomeric section 264 between intermediate plate 252 and intermediate plate 254, and an elastomeric section 266 between intermediate plate 254 and top plate 210. It should be noted that in other embodiments a greater or lesser number of intermediate plates can be used, including no intermediate plates.

Top plate 210 includes mounting holes 212 and 214 that are positioned on flanges of the top plate that extend beyond the elastomer zone with mounting hole 212 located on a flange on a first end of top plate 210 and mounting hole 214 located on a flange on a second end of top plate 210. Such a mounting hole arrangement allows for mounting to a bolster spring mount without using studs extending from the elastomer zone. Bottom plate 220 includes mounting hole 222 that is positioned on a flange on a first end of bottom plate 220 that is also beyond the elastomer zone. An angled flange 230 extends from a second end of bottom plate 220. Angled flange 230 includes a pair of spaced mounting holes 232 and 234 positioned beyond the elastomer zone that are adapted to be directly mounted to a corresponding angled flange of an adjacent bolster spring, as illustrated in FIG. 26. Top plate 210 and bottom plate 220 advantageously extend beyond the elastomer zone, and may be formed complementary in shape with the mounting surface of a bolster spring mount to provide a larger mounting surface area, which forms a stronger mechanical joint.

Figure 13:
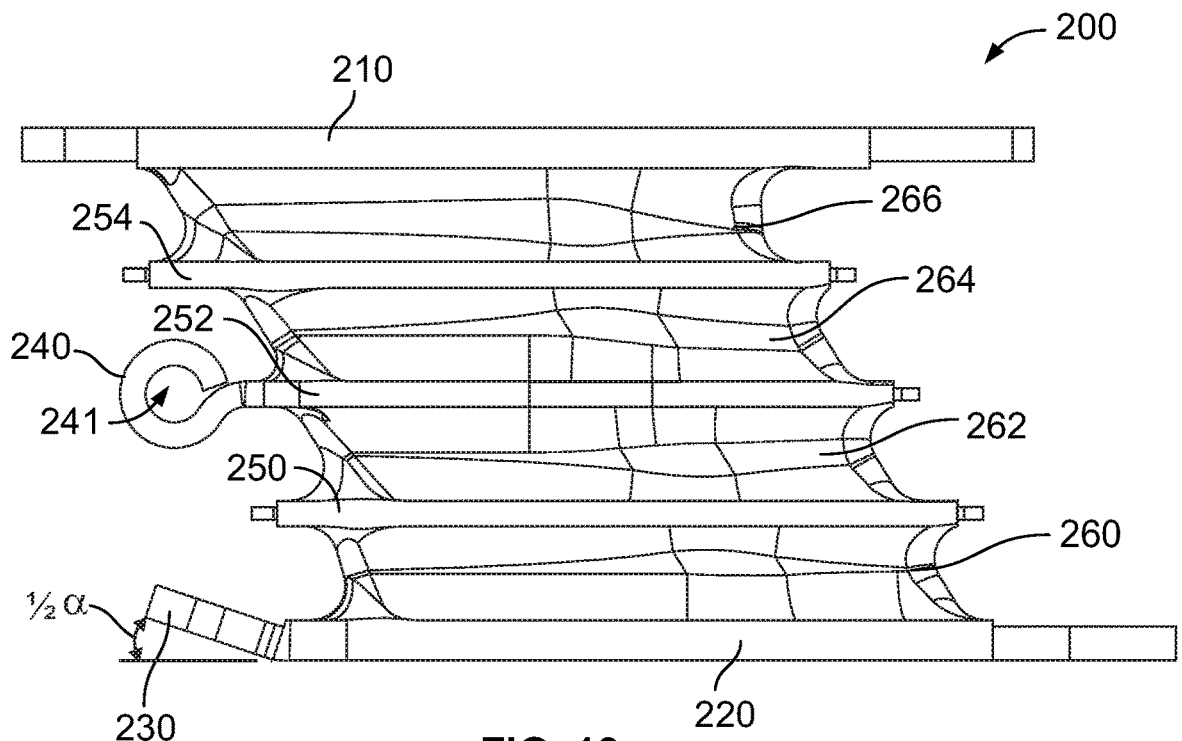
FIG. 13 is a left side view of bolster spring 200 shown in FIGS. 11 and 12.
Figure 14:
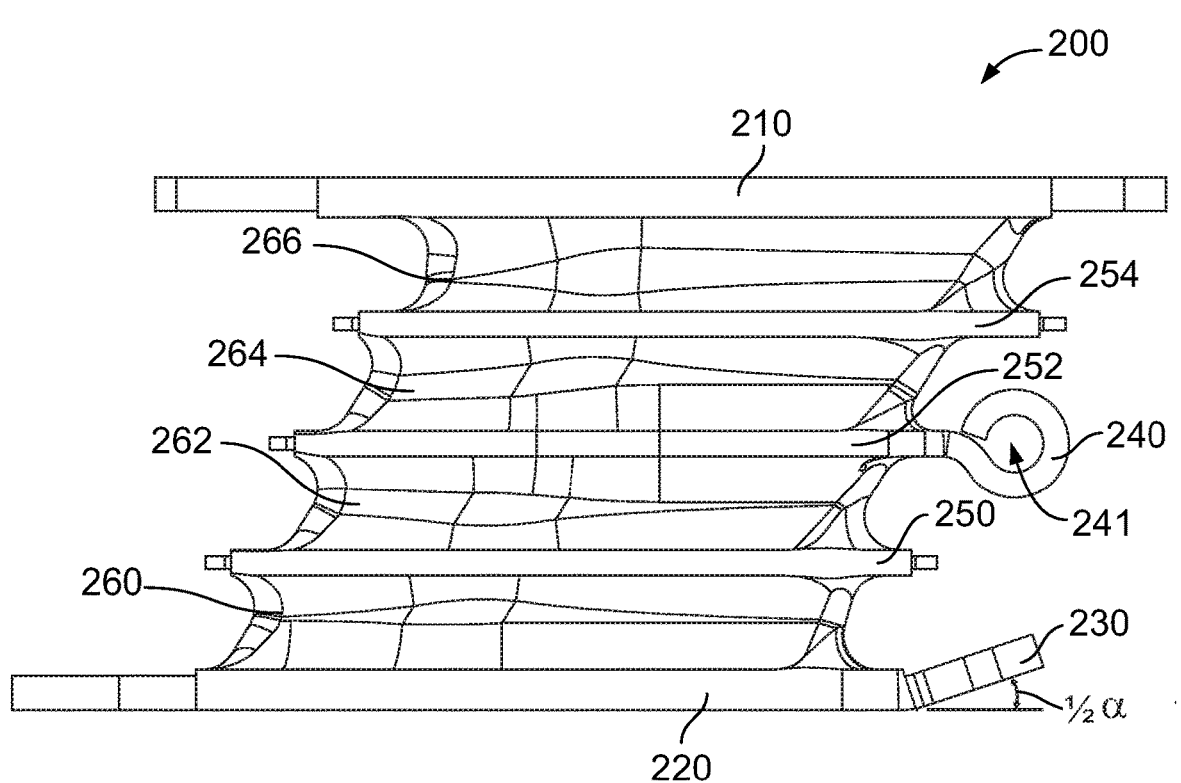
FIG. 14 is a right side view of bolster spring 200 shown in FIGS. 11-13.

As shown in FIGS. 13 and 14, angled flange 230 may extend at an angle that is one half of apex angle $\alpha$, so that when directly mounted to the angled flange of an adjacent bolster spring having the same configuration, an apex angle $\alpha$ is formed between the bottom surfaces of the directly connected bolster springs. In addition, a tie-bar mounting extension 240 having a through hole 241 through which a tie-bar may extend is shown extending from center intermediate plate 252.

Figure 15:
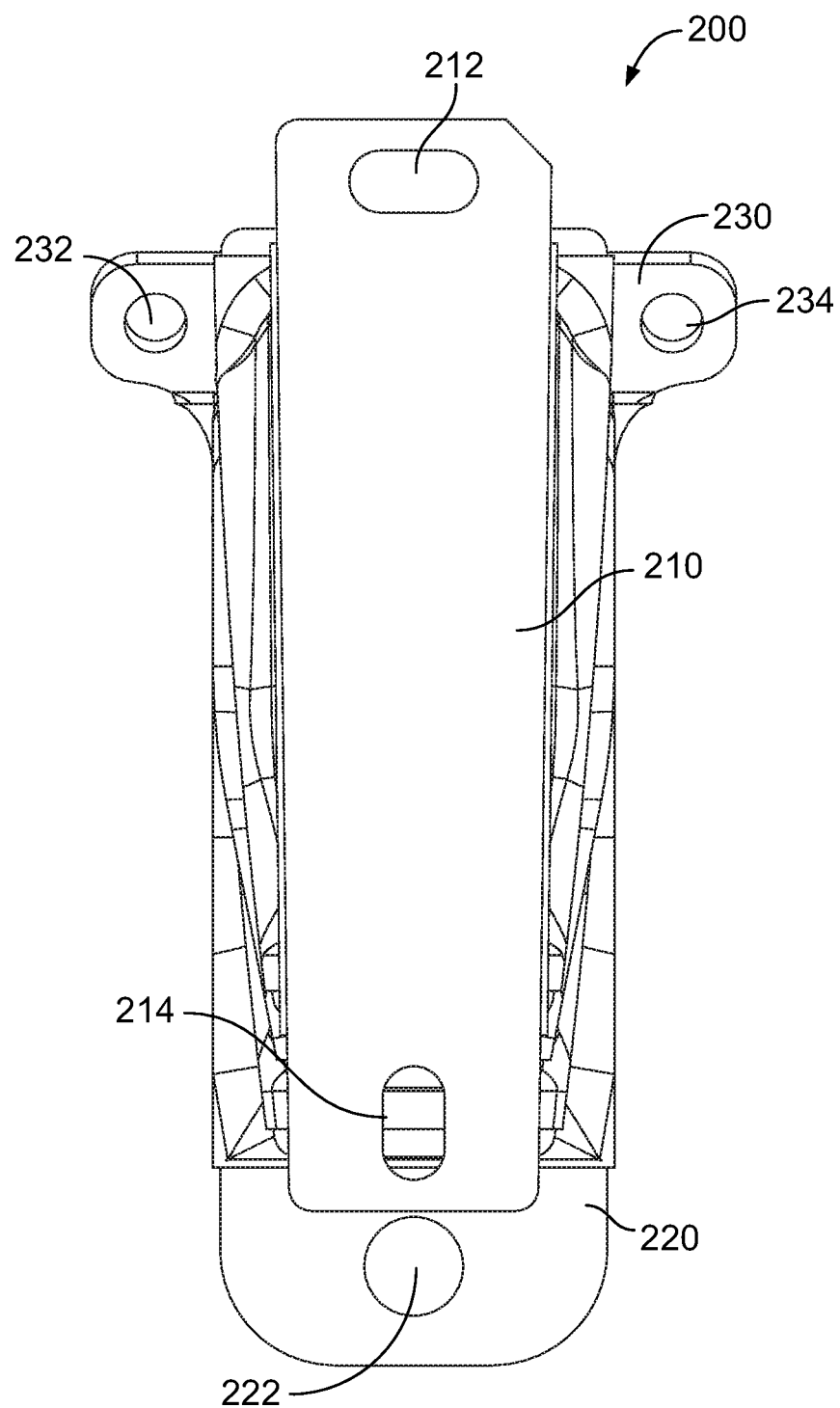
FIG. 15 is a top view of bolster spring 200 shown in FIGS. 11-14.

FIG. 15 is a top view of bolster spring 200. As can be seen, mounting hole 222 of the bottom plate 220 extends beyond the elastomer zone. In addition, mounting holes 232 and 234 on angled flange 230 extend outwardly from the bottom plate 220 and have a spacing that is wider than the width of the bottom plate 220 and the top plate 210. This wide spacing of the mounting holes 232 and 234 on angled flange 230 advantageously provides for greater contact between the angled flange surfaces when mounted as shown in FIG. 26, resulting in a stronger mechanical joint being formed between the angled flanges of the bolster springs.

The particular configuration of the base plate 220, top plate 210, and intermediate plates 250, 252, and 254 of bolster spring 200 is illustrative only, and these components may have a variety of geometries and configurations. Thus, the bolster spring 200 is not required to have, but may have, the geometry shown in FIGS. 9-15. Furthermore, the use of a tie-bar may be, but is not required to be, included.

A bolster spring is typically constructed from relatively flat first and second end plates with an elastomer connected between them. This spring will then have compressive and shear rates corresponding to the chosen material, cross-section, and thickness of elastomer. In accordance with the disclosed embodiments, bolster spring 200 may be constructed of elastomeric sections 260, 262, 264, and 266 bonded to one or more of plates 210, 250, 252, 254, and 220. Elastomeric sections 260, 262, 264, and 266 may comprise an elastomeric material (i.e., an elastomer) such as natural rubber, synthetic rubber, styrene butadiene, synthetic polyisoprene, butyl rubber, nitrile rubber, ethylene propylene rubber, polyacrylic rubber, high-density polyethylene, thermoplastic elastomer, a thermoplastic olefin (TPO), urethane, polyurethane, a thermoplastic polyurethane (TPU), or some other type of elastomer. In this regard and in particular, elastomeric sections 260, 262, 264, and 266 may comprise an elastomer defined as American Society of Testing and Materials (ASTM) D2000 M4AA 717 A13 B13 C12 F17 K11 Z1 Z2. In this case, Z1 represents natural rubber and Z2 represents a durometer selected to achieve a desired shear rate. The selected durometer may be based on a given predefined scale, such as the Shore A scale, the ASTM D2240 type A scale, or the ASTM D2240 type D scale. In a preferred embodiment, in accordance with the Shore A scale, Z2, for example, is preferably 70±5. In another embodiment, in accordance with the Shore A scale, Z2 is, for example, within the range of 50 to 80. Other examples of Z2 and ranges for Z2 are also possible.

In another respect, elastomeric sections 260, 262, 264, and 266 may comprise a viscoelastomeric material that (i) has elastic characteristics when the bolster spring 200 is under a load within a given range and when that load is removed, and (ii) has non-elastic characteristics (for example, does not return to an original non-loaded shape) if the applied load exceeds the greatest load of the given range. The given range may extend from no load to a maximum expected load plus a given threshold. The given threshold accounts for possible overloading of bolster spring 200. As an example, the viscoelastomeric material may comprise amorphous polymers, semi-crystalline polymers, and biopolymers. Other examples of the viscoelastomeric material are also possible.

In accordance with the example embodiments, elastomeric sections 260, 262, 264, and 266 may also comprise one or more fillers. The filler(s) may optimize performance of elastomeric sections 260, 262, 264, and 266. The fillers may include, but are not limited to, wax, oil, curing agents, and/or carbon black. Such fillers may optimize performance by improving durability and/or tuning the elastomeric sections for a given shear load and/or a given compressive load applied to the elastomeric sections. Improving durability through the use of fillers may include, for example, minimizing a temperature rise versus loading characteristic of the elastomeric sections and/or maximizing shape retention of the elastomeric sections.

Bolster spring 200 may be formed, for example, by inserting the plates 210, 250, 252, 254, and 220 into a mold (not shown). The plates may each be coated with a coating material. As an example, the coating material may comprise a material comprising zinc and phosphate, modified with calcium. The coating material may have a coating weight of 200-400 milligrams per square foot. Other examples of the coating material are also possible. A bonding agent may be applied to the coated plates for bonding the plates to the elastomeric sections. As an example, the bonding agent may comprise Chemlok® manufactured by the Lord Corporation, Cary, N.C., USA. Other examples of the bonding agent are also possible. Applying the coating material and/or applying the bonding agent may occur prior to, during, and/or after insertion of the plates into the mold. After applying the coating material and the bonding agent, the elastomeric material (while in a pourable form) may be inserted into the mold to form the elastomeric sections.

In a preferred embodiment, any exposed portion of the plates (for example, a portion of the plates not covered by the elastomeric material) is protected against corrosion by a means other than the elastomeric material. In other embodiments, some exposed portions of the plates (e.g., the edges of the plates) may not be protected against corrosion, whereas any other exposed portions of the plates are protected against corrosion.

The plates 210, 250, 252, 254, and 220 can be made of any of a variety of suitable materials, including, but not limited to, iron, steel, aluminum, plastic, a composite material, or some other material. The plates may be fully, or at least substantially, encapsulated in elastomer to further enhance their corrosion resistance and friction at the mating suspension members. As an example, plates 210, 250, 252, 254, and 220 can comprise plates having a thickness between a range of 0.188 inches (3.00 mm) to 0.25 inches (6.35 mm), or more.

Figure 16A:
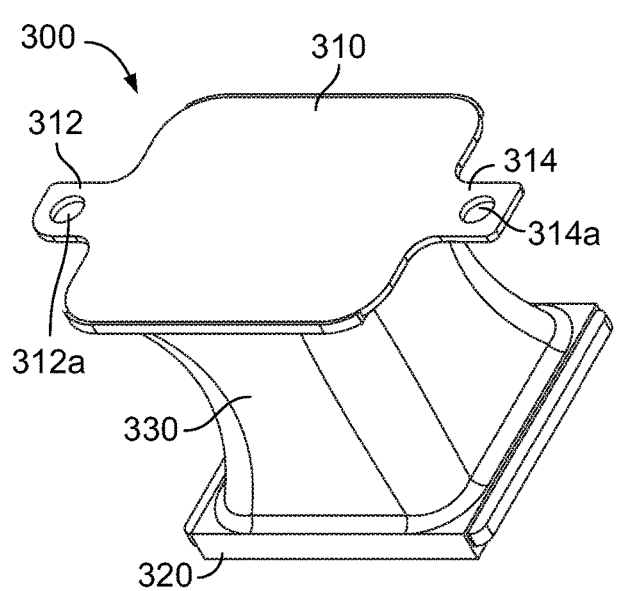
FIG. 16A is a perspective top view of load cushion 300, according to an example embodiment.
Figure 16B:
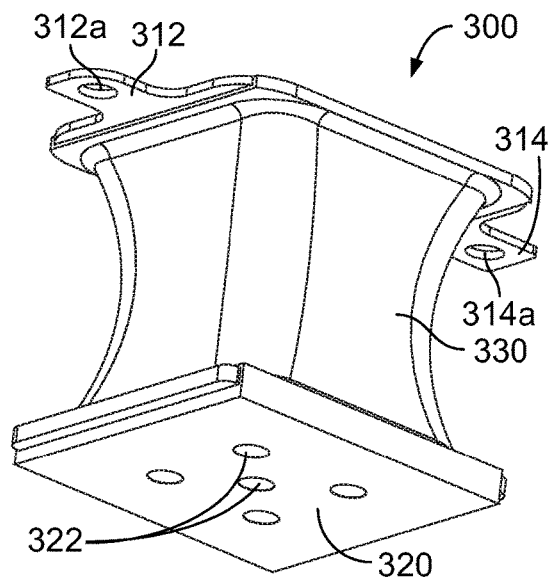
FIG. 16B is a perspective bottom view of load cushion 300 shown in FIG. 16A.
Figure 17:
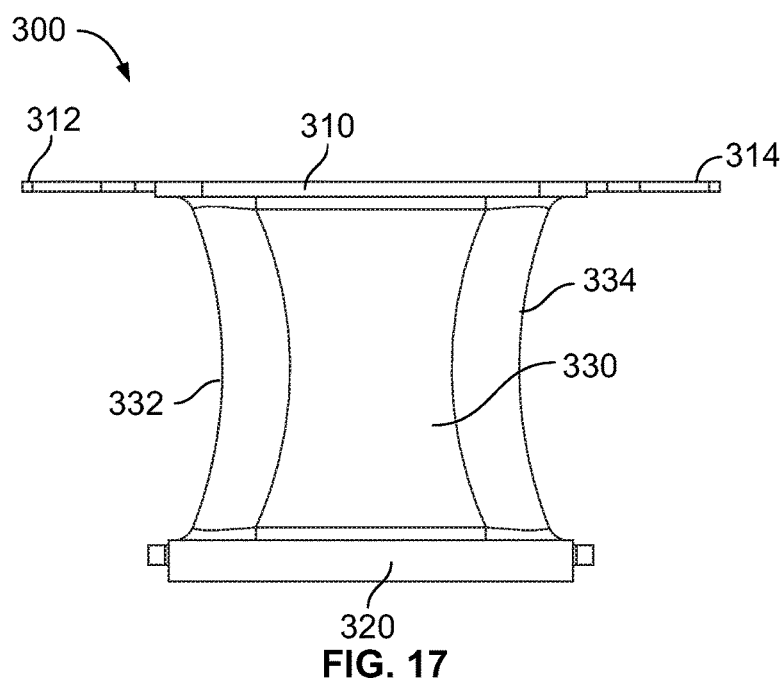
FIG. 17 is a right side view of load cushion 300 shown in FIGS. 16A-16B.
Figure 18:
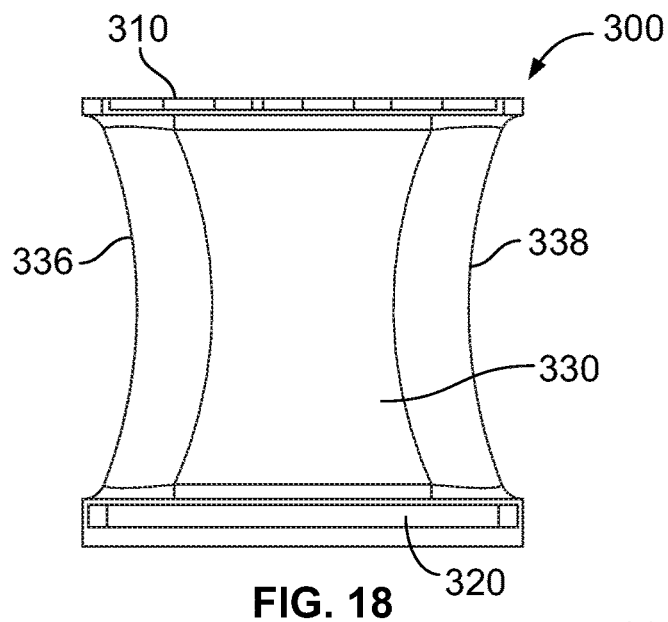
FIG. 18 is front view load cushion 300 shown in FIGS. 16A-17.
Figure 19:
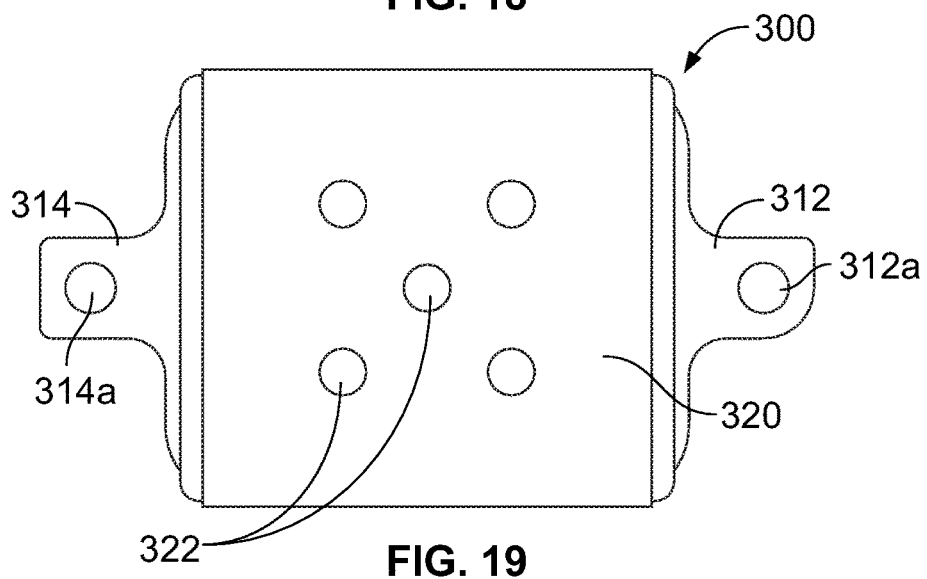
FIG. 19 is a bottom view of load cushion 300 shown in FIGS. 16A-18.
Figure 20:
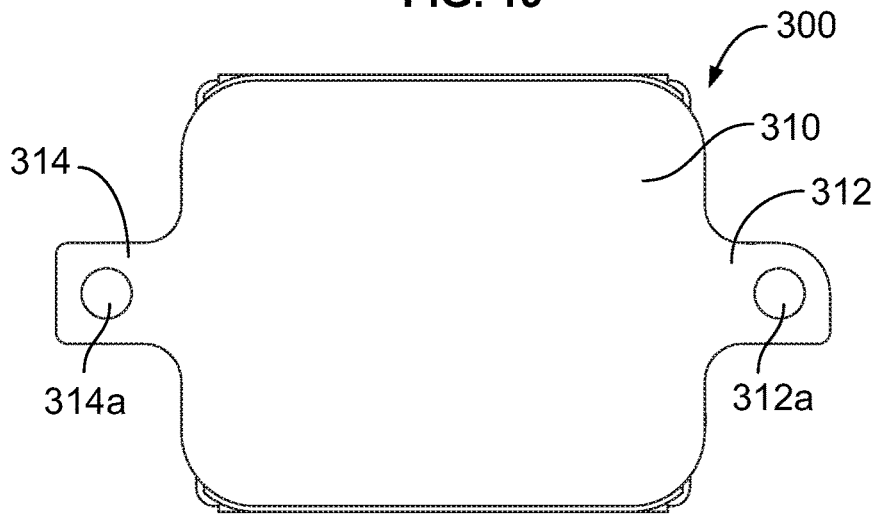
FIG. 20 is a top view of load cushion 300 shown in FIGS. 16A-19.

FIGS. 16A and 16B are perspective views of an example load cushion 300 for use in vehicle suspension 50. FIG. 17 is a side view, FIG. 18 is a front view, FIG. 19 is a bottom view, and FIG. 20 is a top view of load cushion 300. Load cushion 90 shown in vehicle suspension 50 in FIGS. 1-10 may be arranged as load cushion 300.

As shown in one or more of FIGS. 16A-20, load cushion 300 includes a top plate 310, a bottom plate 320, and a load cushion portion 330. Top plate 310 includes mounting flange 312 with mounting hole 312a and mounting flange 314 with mounting hole 314a adapted for mounting to load cushion mounts 92 and 94 (shown in FIGS. 2 and 4) of vehicle suspension 50. In this embodiment, a horizontal cross section of the cushion portion 330 is generally square with rounded corners, although it could also be generally circular, rectangular, or conic. As shown in FIGS. 16B and 19, the bottom plate 320 includes holes 322 that are used during the molding process to provide a passage for the elastomeric material that forms the cushion portion 330.

As shown in FIG. 17, the load cushion portion 330 has a unique symmetrical shape that includes curvilinear front and rear outer surfaces 332 and 334 that taper towards the center at the midpoint between the top plate 310 and bottom plate 320 such that the narrowest thickness of the load cushion 330 occurs at the midpoint. Similarly, as shown in FIG. 18, the load cushion portion 330 has a unique symmetrical shape that includes curvilinear left and right outer surfaces 336 and 338 that taper towards the center at the midpoint between the top plate 310 and bottom plate 320 such that the narrowest thickness of the load cushion 330 occurs at the midpoint.

Load cushion 330 may have a cross section where front and rear outer surfaces 332 and 334 have a negative Gaussian curvature, and similarly load cushion 330 may have a cross section where left and right outer surfaces 336 and 338 have a negative Gaussian curvature. In addition, load cushion portion 330 may be shaped as a hyperboloid. The curved outer surfaces of the load cushion portion result in a much lower elastomeric strain on the load cushion for the same deflection as compared to a linearly reduced cross-section.

The load cushion 90 may undergo 50% compression at full jounce, or when the hard stop discussed above is reached. At this point, the cross-section of the load cushion portion 330 changes from a negative Gaussian curvature to a 0 or slightly positive Gaussian curvature. As used herein the term, 0 Gaussian curvature means that the outer surfaces of the cross-section are parallel, and a "slightly positive Gaussian curvature" means that the midpoint of the load cushion portion 330 becomes wider than the end sections, by up to 1 cm on each side of the load cushion portion.

It will be appreciated that bottom plate 320 is not required, and the load cushion 330 may have an exposed surface instead of having bottom plate 320. The use of a bottom plate 320 does not affect in any significant way the load cushion load versus deflection curve. However, the bottom plate 320 may be incorporated to protect the active elastomer of the load cushion portion 330 from debris such as rocks that could inadvertently end up on the reaction plate that is positioned beneath the load cushion. Debris could become embedded temporarily or permanently into the elastomer and create an undesirable crack initiation site.

The bottom plate 320 may be encapsulated to provide for improved corrosion resistance, elimination of metal to metal contact resulting in noise reduction upon contact with the reaction plate, improved friction between the load cushion 300 and the reaction plate 190 (shown in FIGS. 9 and 10) to reduce or minimize wear between the bottom plate 320 and the reaction plate 190 during vehicle motion because relative motion is decreased or eliminated. In addition, encapsulation may be used as a service wear and replacement indicator similar to wear bars found between tire treads.

Load cushion 300 may have a continuously increasing spring rate as an applied load increases and a continuously decreasing spring rate as an applied load decreases, due to it generally conic shape.

The top plate 310 and base plate 320 may be constructed of any of a variety of suitable materials, including, but not limited to, iron, steel, aluminum, plastic, and a composite material. As an example, the base plate can comprise a plate having a thickness between a range of 0.188 inches (3.00 mm) to 0.25 inches (6.35 mm), or more. The plates can be encapsulated in elastomer and/or bonded to the load cushion portion using a bonding agent. The plate dimensions and shape can be varied to any dimension or shape desired for packaging, weight, and aesthetics. Preferably, the load cushion top plate 310 is dimensioned to (i) match the surface of the load cushion mount described herein, such as load cushion mounts 92 and 94, (ii) locate mounting holes for securing the load cushion 300 to the load cushion mounts 92 and 94, and (iii) minimize overall mass.

The size and dimensions of the elastomer used for the cushion portion 330 of load cushion 300 may be optimized for the vertical spring rate requirements. As noted above, the vertical spring rate for the load cushions 300 may continuously increase with increasing load and continuously decreases with decreasing load, defining a curvilinear shape with no discontinuities on a graph illustrating spring rate as a function of sprung load.

Preferably, load cushion portion 330 has a generally conic shape as it extends towards a midpoint between top plate 310 and bottom plate 320. With this preferred shape, the vertical spring rate for the load cushion 300 linearly increases with increasing load and linearly decreases with decreasing load. In this regard, load cushion 300 is operable as a progressive spring rate load cushion. In one embodiment, the cross section of load cushion portion 330 adjacent top plate 310 and adjacent bottom plate 320 is 110 mm by 110 mm. At the midpoint between the top plate 310 and the bottom plate 320 the load cushion portion 330 the cross section is 88 mm by 88 mm, and the height of load cushion portion 330 is 105 mm not including plates or wear layer encapsulation. Other example dimensions of portions of load cushion 300 are also possible. For a given geometry, the spring rate of load cushion 300 may be optimized by varying the durometer of the elastomer. By varying the durometer, a family of interchangeable progressive spring rate load cushions can be created.

It will further be appreciated that the load cushion 300 may be mounted with the cushion portion 330 extending either above or below the bottom plate 310. Likewise, the load cushion 300 may be mounted such that the top plate 310 extends beneath the bottom plate 320. Therefore, the use of the terms "top" and "bottom" are used simply to describe the plates 310 and 320 that are attached to the load cushion portion 330, and do not in any way require that the load cushion 300 is mounted in any particular configuration.

Figure 21B:
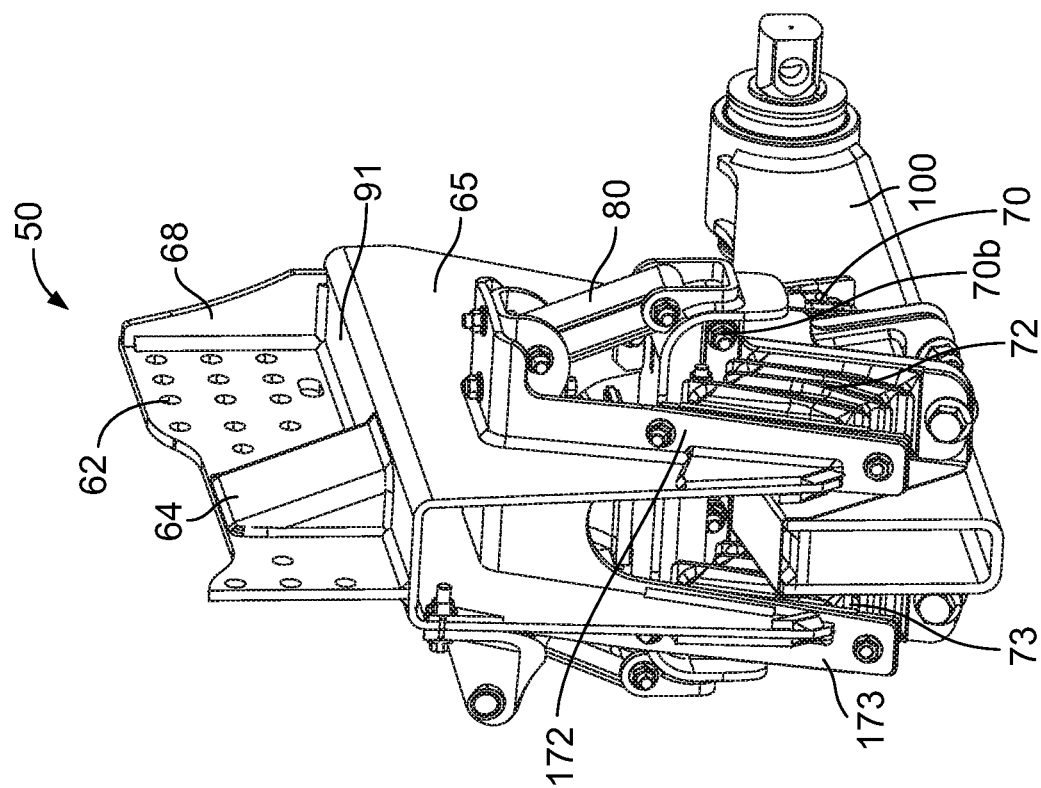
FIG. 21B is a cross-sectional, perspective view of the outboard of vehicle suspension 50, taken along line 21B-21B in FIG. 2.
Figure 21A:
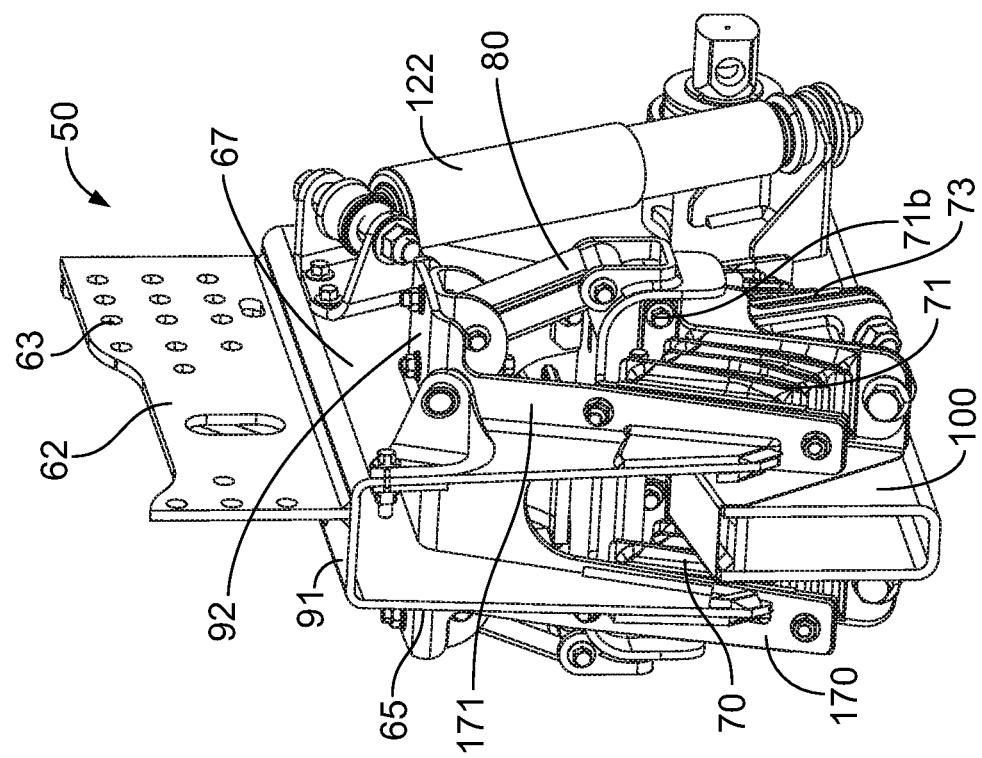
FIG. 21A is a cross-sectional, perspective view of the inboard side of vehicle suspension 50, taken along line 21A-21A in FIG. 4.

FIG. 21A is a cross sectional inboard perspective view of vehicle suspension 50 taken along line 21A-21A shown in FIG. 4, and FIG. 21B is a cross sectional inboard perspective view of vehicle suspension 50 taken along line 21B-21B shown in FIG. 2. Frame attachment portion 62 with mounting holes 63 is shown extending upwardly from upper surface 91 of the saddle with central flange 64 and gusset 68. Shock absorber 122 is shown mounted to inboard surface 67 of the saddle and rebound strap 80 is shown extending beneath load cushion mount 92. Bolster springs 70 and 71 are shown mounted to bolster spring mounts 170 and 171 on opposite sides of equalizing beam 100. Similarly, bolster springs 72 and 73 are shown mounted to bolster springs mounts 172 and 173 on opposite sides of equalizing beam 100. In addition, common fastener 71b is shown directly mounting bolster spring 71 to bolster spring 73 and common fastener 70b is shown directly mounting bolster spring 70 to bolster spring 72.

FIG. 22A is a cross sectional inboard perspective view of vehicle suspension 50 taken along line 22A-22A shown in FIG. 4, and FIG. 22B is a cross sectional outboard perspective view of vehicle suspension 50 taken along line 22B-22B shown in FIG. 2. Frame attachment portion 62 with mounting holes 63 is shown extending upwardly from upper surface 91 of the saddle with central flange 64 and gusset 68. Shock absorber 122 is shown mounted to inboard surface 67 of the saddle and rebound straps 80 are shown extending on opposite sides of load cushion 90. Load cushion 90 can be seen positioned directly above reaction plate 190. Load cushion 90 is also shown mounted to the load cushion mounts extending from walls 65 and 67 of the saddle using fasteners 290a.

Spring saddle 193 is shown supporting reaction plate 190. Throughhole 70d is positioned in reaction plate 190 to allow a fastener to extend therethrough for mounting together the angled flanges of bolster springs 70 and 72. Similarly, throughhole 71d is positioned in reaction plate 190 to allow a fastener to extend therethrough for mounting together the angled flanges of bolster springs 71 and 73.

In addition, equalizing beam 100 is shown having a U-shaped cross section with opposed walls 100a and 100b. A tie-bolt 101 having a sleeve 103 is used to tie the two walls 100a and 100b together. Tie-bolt 101 is used to relieve stress in the equalizing beam 100 where the bolster springs 70-73 are attached by "pinching" walls 100a and 100b together such that their inner surfaces contact respective end surfaces of sleeve 103.

Figure 23B:
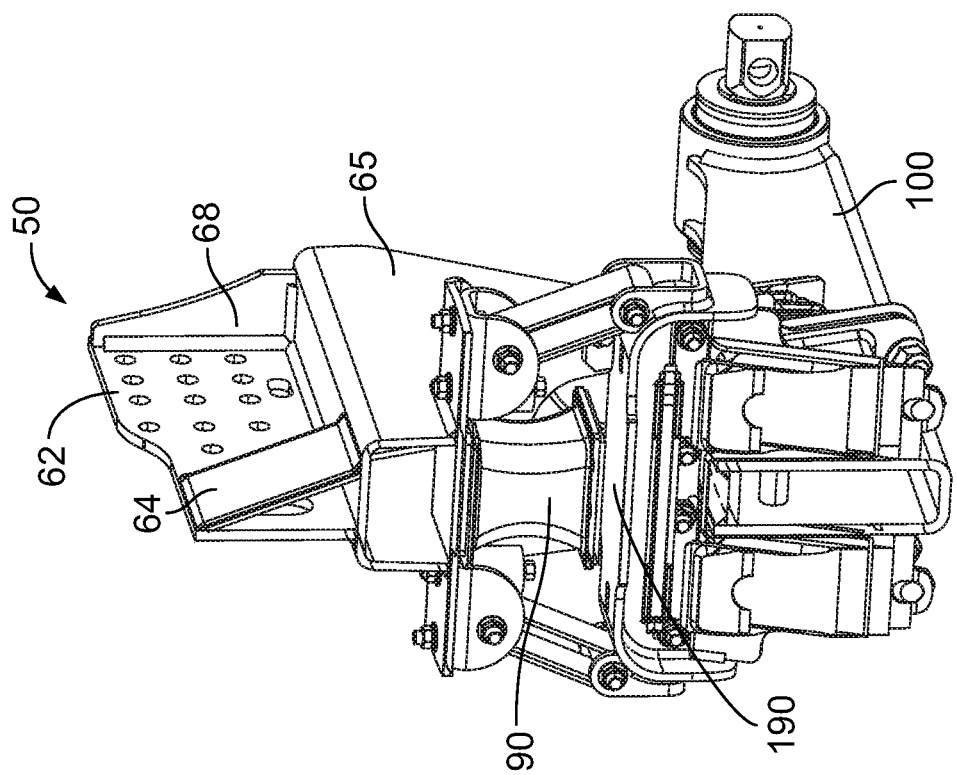
FIG. 23B is a cross-sectional, perspective view of the outboard of vehicle suspension 50, taken along line 23B-23B in FIG. 2.
Figure 23A:
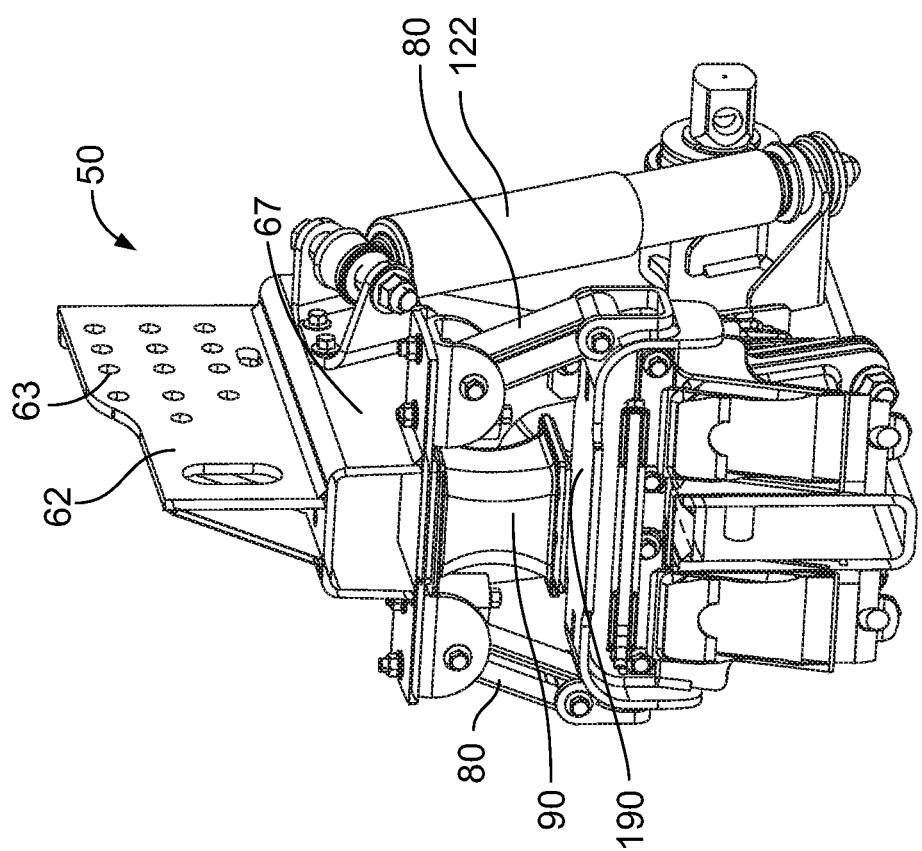
FIG. 23A is a cross-sectional, perspective view of the inboard side of vehicle suspension 50, taken along line 23A-23A in FIG. 4.

FIG. 23A is a cross sectional inboard perspective view of vehicle suspension 50 taken along line 23A-23A shown in FIG. 4, and FIG. 23B is an outboard perspective cross sectional view of vehicle suspension 50 taken along line 23B-23B shown in FIG. 2. Frame attachment portion 62 with mounting holes 63 is shown extending upwardly from upper surface 91 of the saddle with central flange 64 and gusset 68. Shock absorber 122 is shown mounted to inboard surface 67 of the saddle and rebound straps 80 are shown extending on opposite sides of load cushion 90. Load cushion 90 can be seen positioned directly above reaction plate 190. Load cushion 90 is also shown mounted to the load cushion mounts extending from walls 65 and 67 of the saddle.

Figure 24:
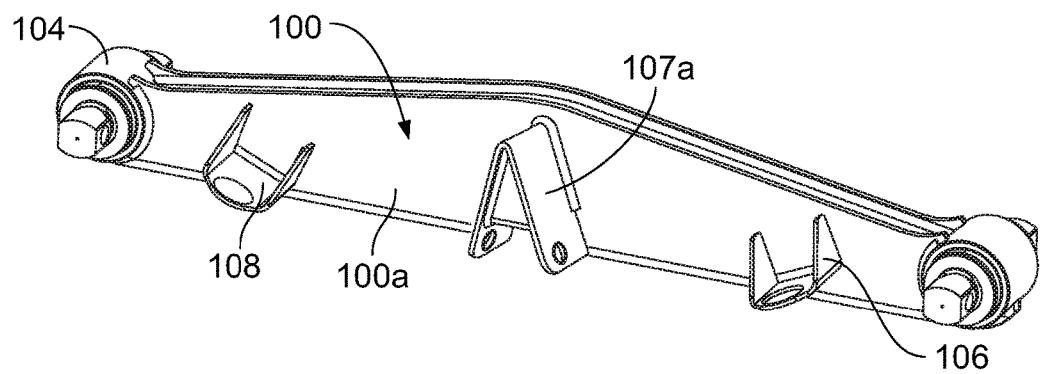
FIG. 24 is a perspective view of equalizing beam 100 of vehicle suspension 50 shown in FIGS. 1A-10; according to an example embodiment.
Figure 25:
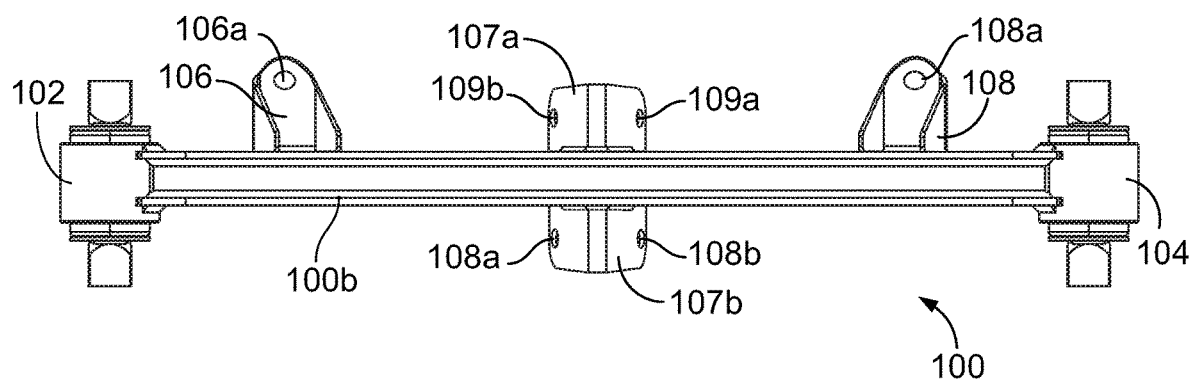
FIG. 25 is a top view of equalizing beam 100 shown in FIG. 24.

FIG. 24 is a perspective view of the inboard side of equalizing beam 100 and FIG. 25 is a top view of equalizing beam 100. Beam hubs 102 and 104 are located on opposite ends of the equalizing beam 100. Shock absorber mount 106 having mounting hole 106a and shock absorber mount 108 having mounting hole 108a are shown positioned on the inboard side of the equalizing beam 100. Bolster spring mounts 107a and 107b extend from opposite sides of the center of equalizing beam 100. On the inboard side, the walls of bolster spring mount 107a include mounting holes 109a and 109b that are used to mount bolster springs 71 and 73 (shown in FIG. 3), and on the outboard side, the walls of bolster spring mount 107b include mounting holes 108b and 108a that are used to mount bolster springs 70 and 72 (shown in FIG. 2).

The equalizing beam 100 is shown in an illustrative configuration. However, equalizing beam 100 may be constructed in any of a variety of arrangements and with a variety of configurations and/or materials.

Figure 26:
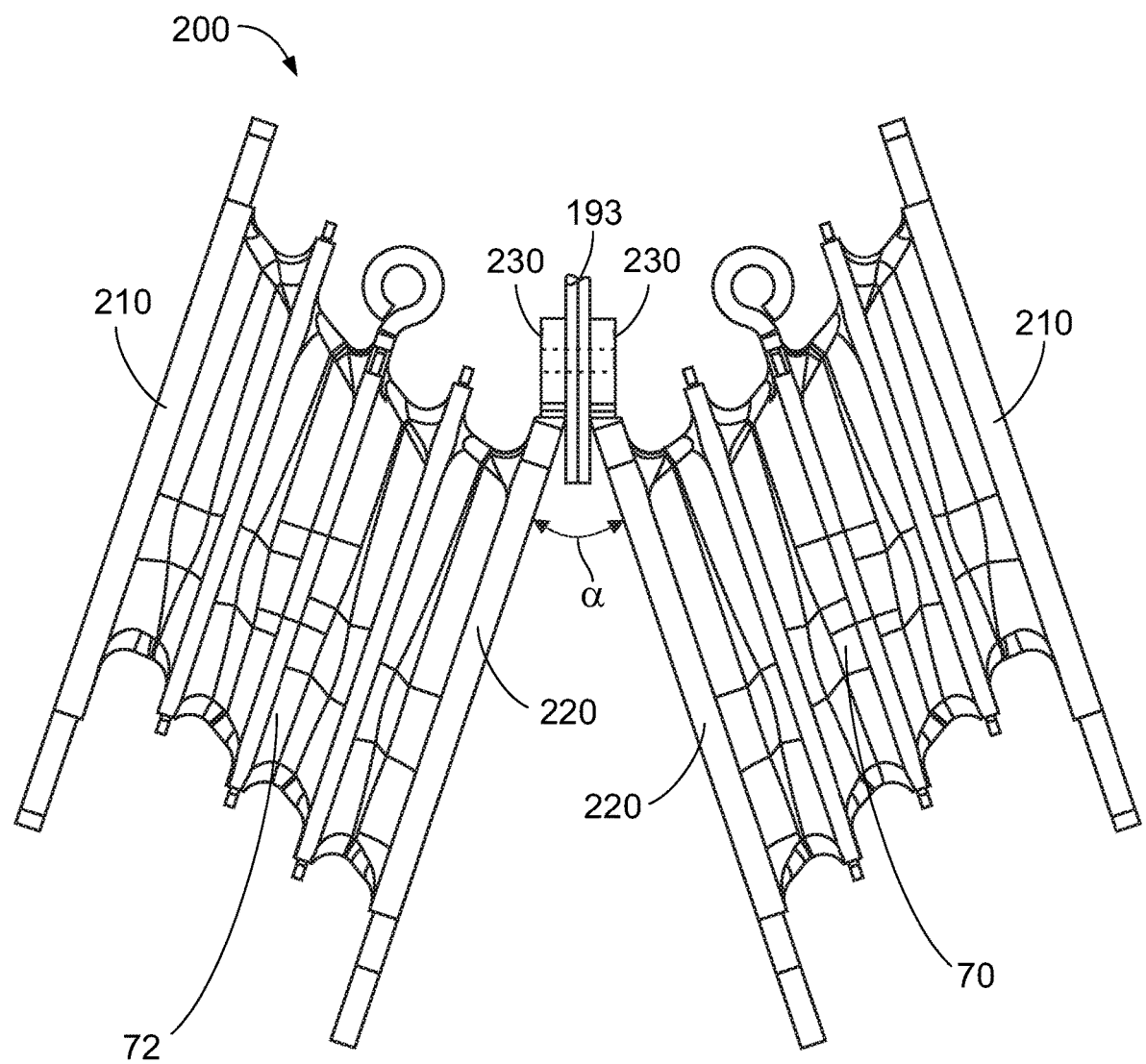
FIG. 26 is a close up view showing how bolster springs 70 and 72 may be mounted to each other with a common fastener.
Figure 27:
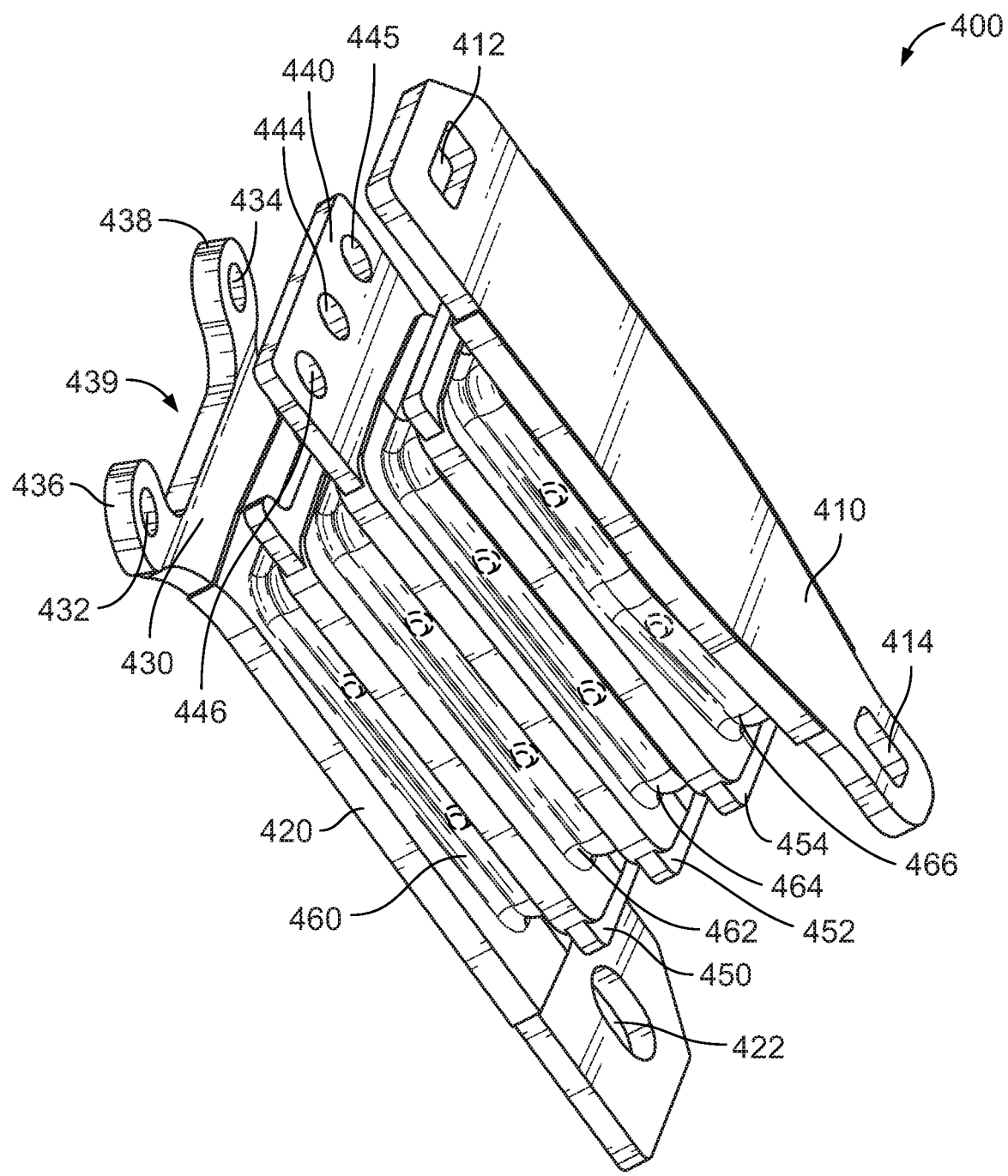
FIG. 27 is a perspective view of bolster spring 400.
Figure 28:
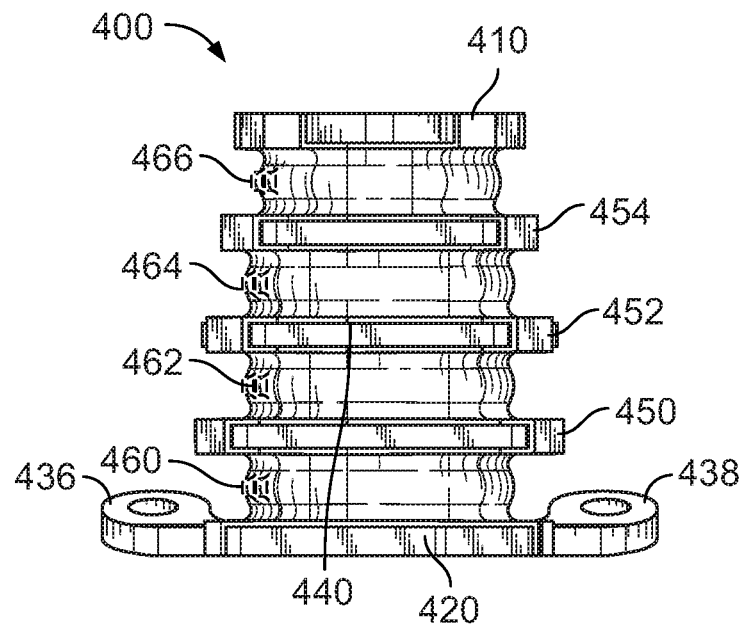
FIG. 28 is a rear view of bolster spring 400.
Figure 29:
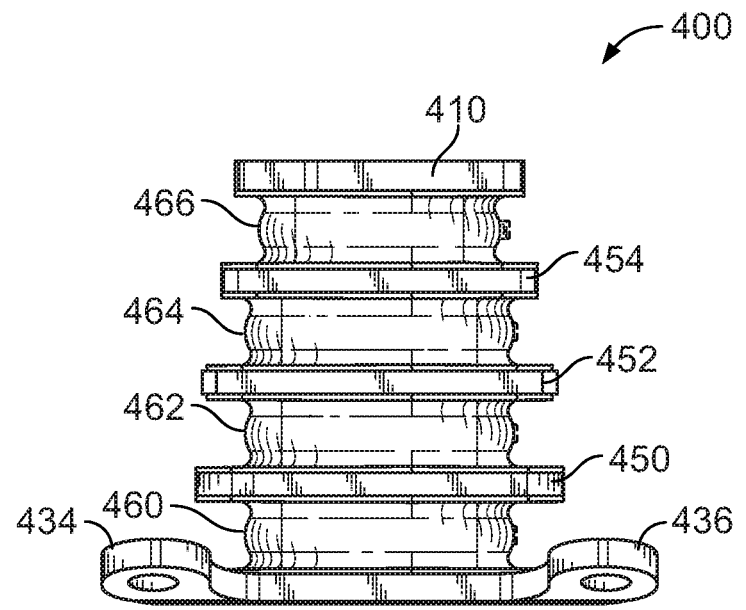
FIG. 29 is a front view of bolster spring 400.
Figure 30:
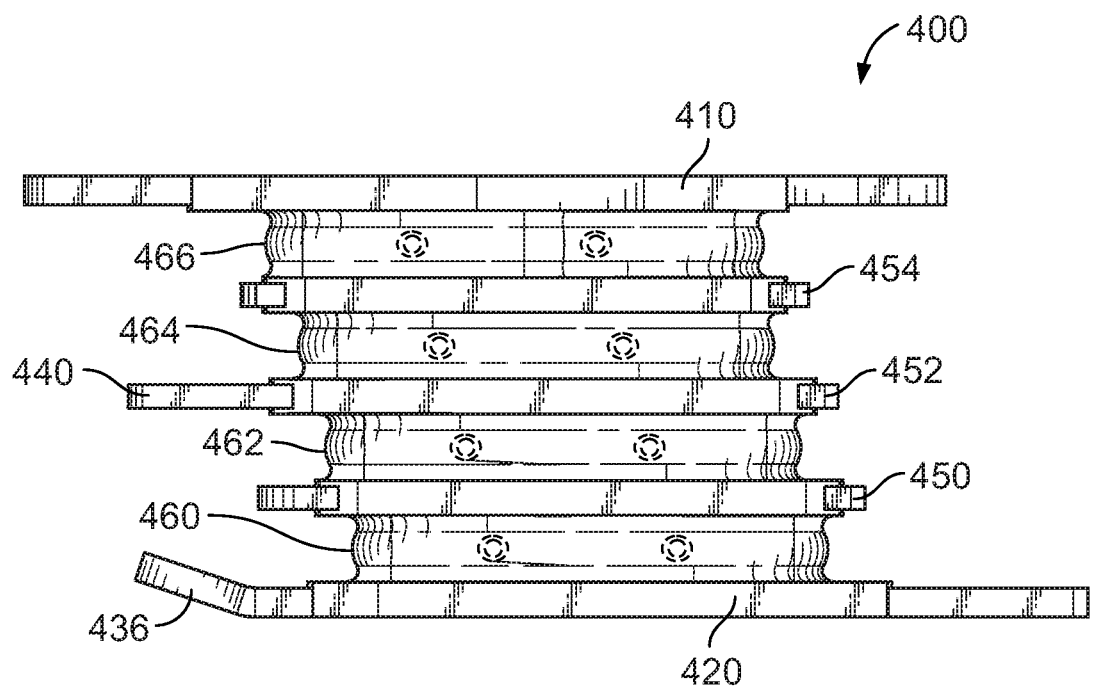
FIG. 30 is a right side view of bolster spring 400.
Figure 31:
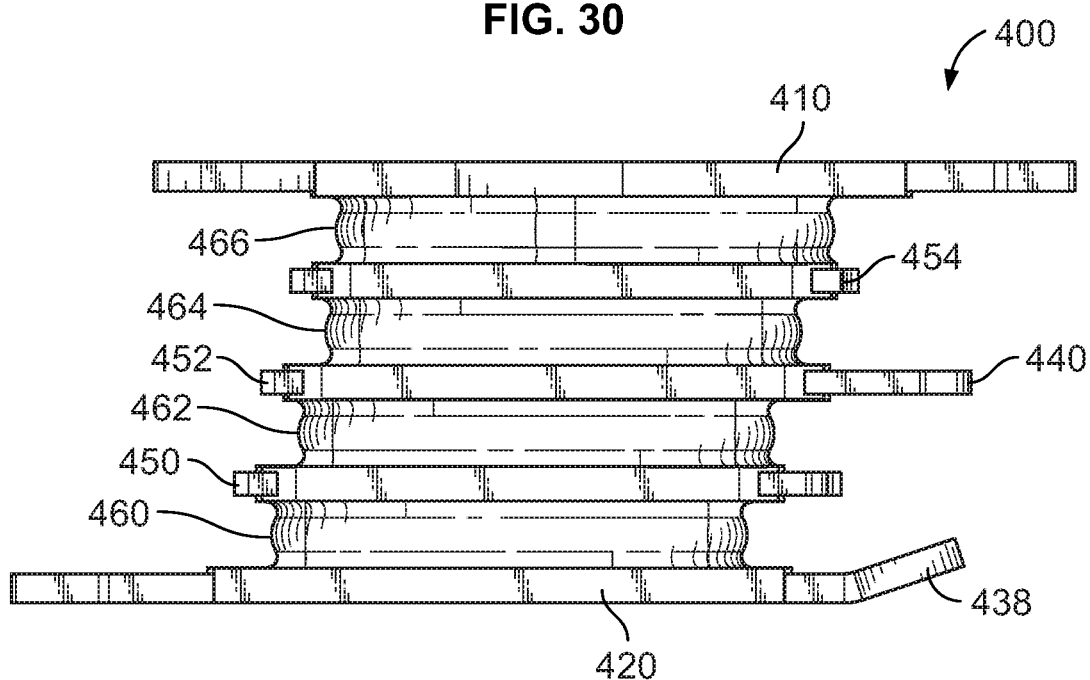
FIG. 31 is a left side view of bolster spring 400.
Figure 32:
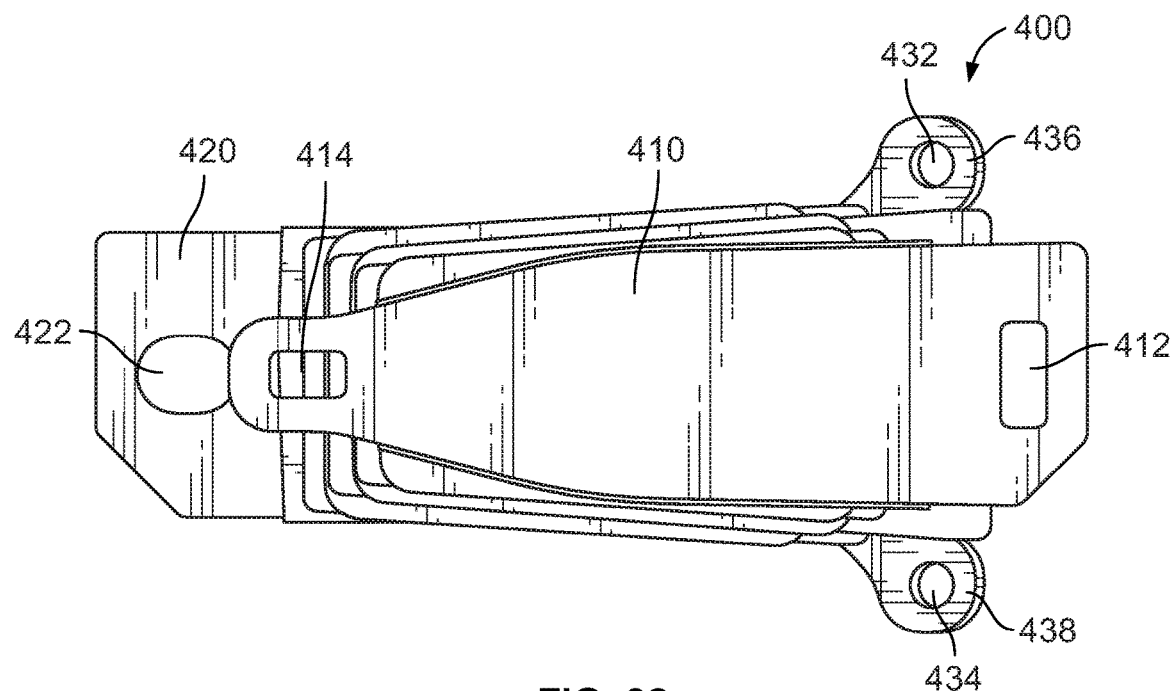
FIG. 32 is a top view of bolster spring 400.
Figure 33:
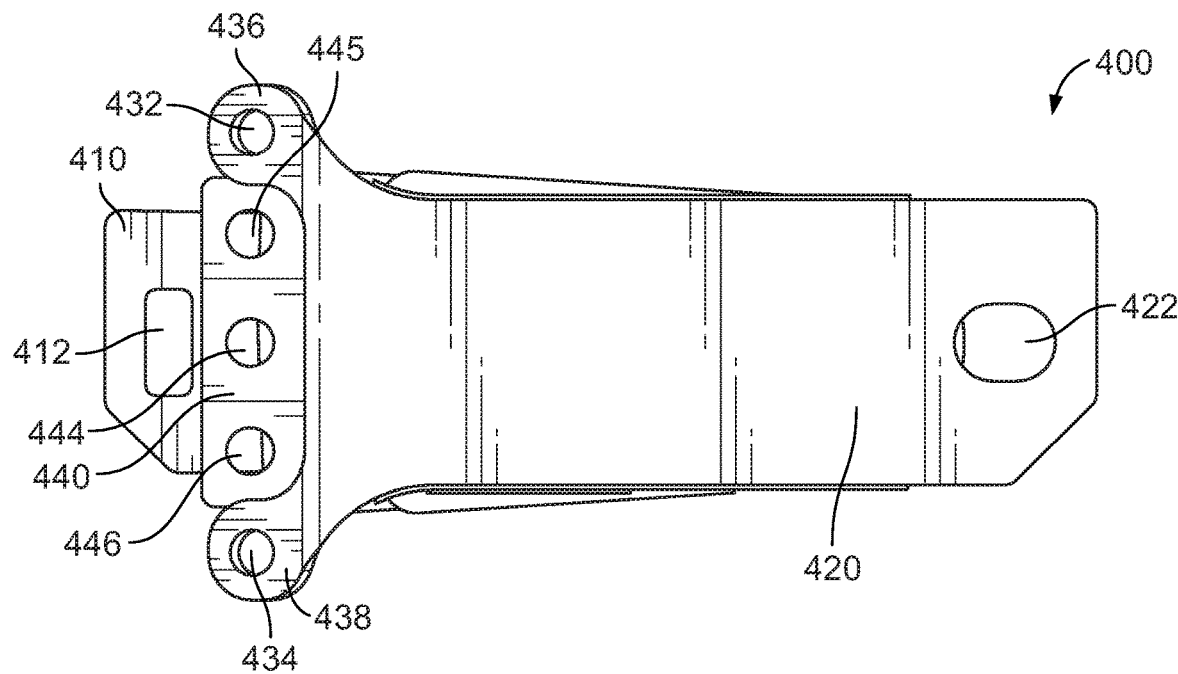
FIG. 33 is a bottom view of bolster spring 400.

FIG. 26 provides an illustration showing how bolster springs 70 and 72 may be directly mounted to each other using common fasteners. In particular, flanges 230 of bolster springs 70 and 72 are positioned together as shown, with spring saddle 193 extending therebetween, wherein a pair of common fasteners may be used to directly mount the bolster springs 70 and 72 together. Spring saddle 193 may be formed from a pair of bent plates having a thickness of 6 mm, such that the flanges 230 are positioned 12 mm apart. In addition, apex angle α is shown between the bottom surfaces of bottom plates 220 of bolster springs 70 and 72.

FIGS. 27-33 show various view of bolster spring 400, that may be used in suspension assembly 50 described above. Bolster spring 400 includes a top plate 410 having mounting apertures 412 and 414. Bolster spring 400 also includes a bottom plate 420 having mounting aperture 422. Intermediate plates 450, 452, and 454 are positioned between top plate 410. Elastomeric section 460 is positioned between bottom plate 420 and intermediate plate 450. Elastomeric section 462 is positioned between intermediate plate 450 and intermediate plate 452. Elastomeric section 464 is positioned between intermediate plate 452 and intermediate plate 454. Elastomeric section 466 is positioned between intermediate plate 454 and top plate 410. Elastomeric sections 460, 462, 464, and 466 may be constructed in the same manner and with the same materials as described above with respect to bolster spring 200. In addition, top plate 410, bottom plate 420, and intermediate plates 450, 452, and 454 may be constructed in the same manner and the same materials as described above with respect to bolster spring 200.

Bottom plate 420 includes an extending section 430 from which upwardly extending ears 436 and 438 extend at an angle. A gap 439 extends between ears 436 and 438 to provide additional mounting clearance. Ear 436 includes a mounting aperture 432 and ear 438 includes a mounting aperture 434. Ears 436 and 438 together constitute an upwardly extending flange. Intermediate plate 452 advantageously includes a rearwardly extending flange 440 that includes mounting apertures 444, 445, and 446 that are adapted for attachment to a tie-bar.

Figure 34:
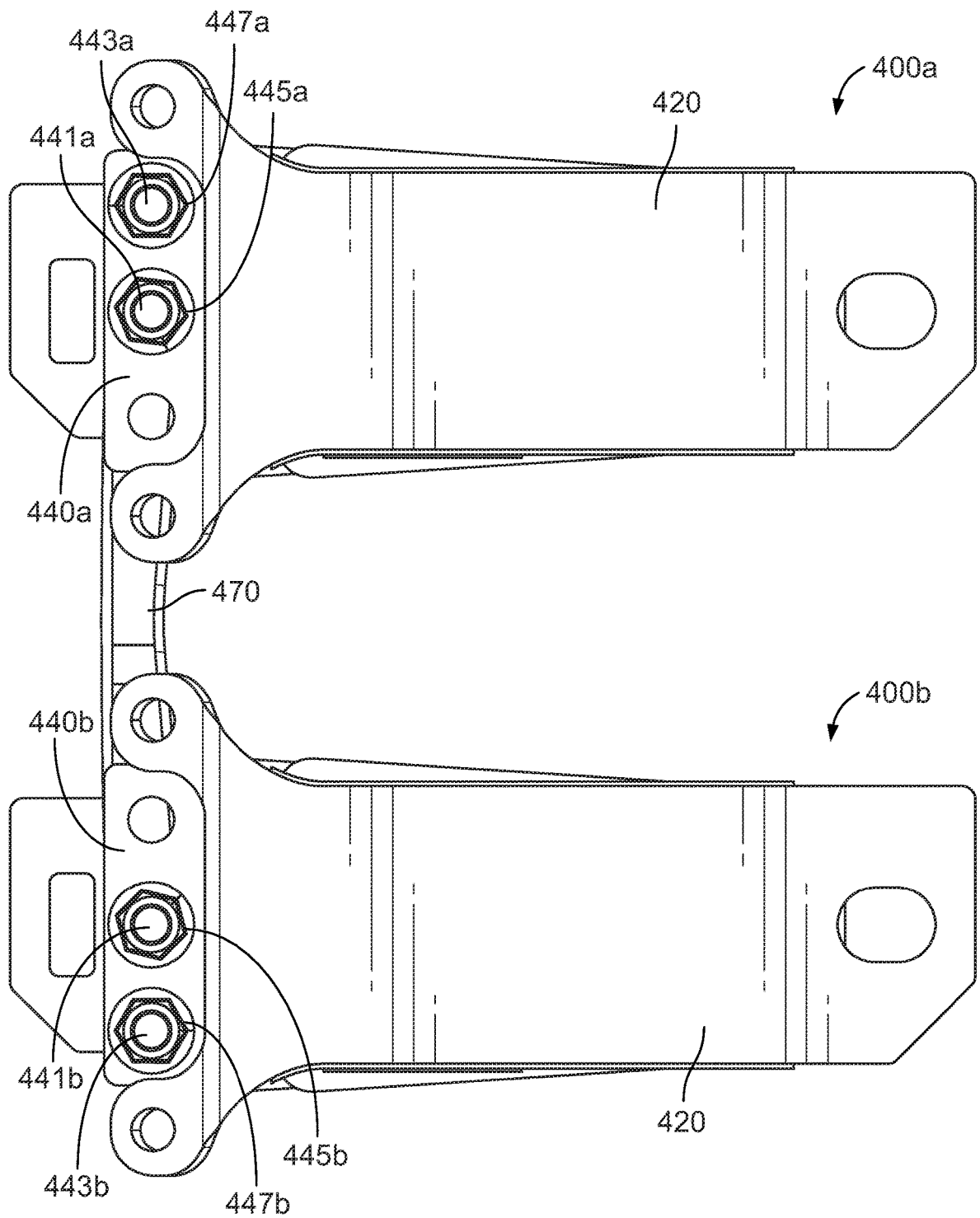
FIG. 34 is a bottom view of a suspension subassembly including bolster springs 400a and 400b.
Figure 35:
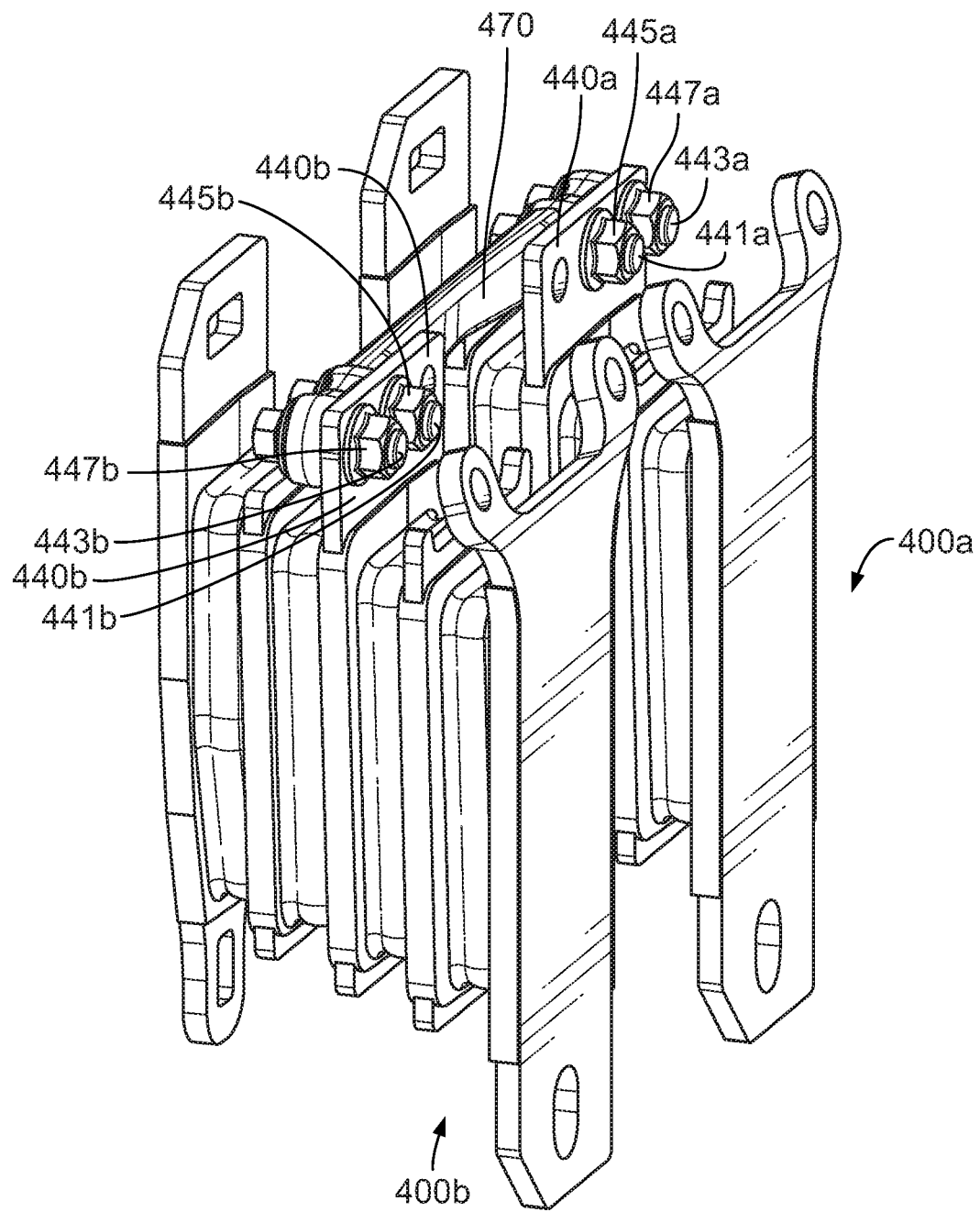
FIG. 35 is a perspective view of a suspension subassembly including bolster springs 400a and 400b, shown in FIG. 34.
Figure 36:
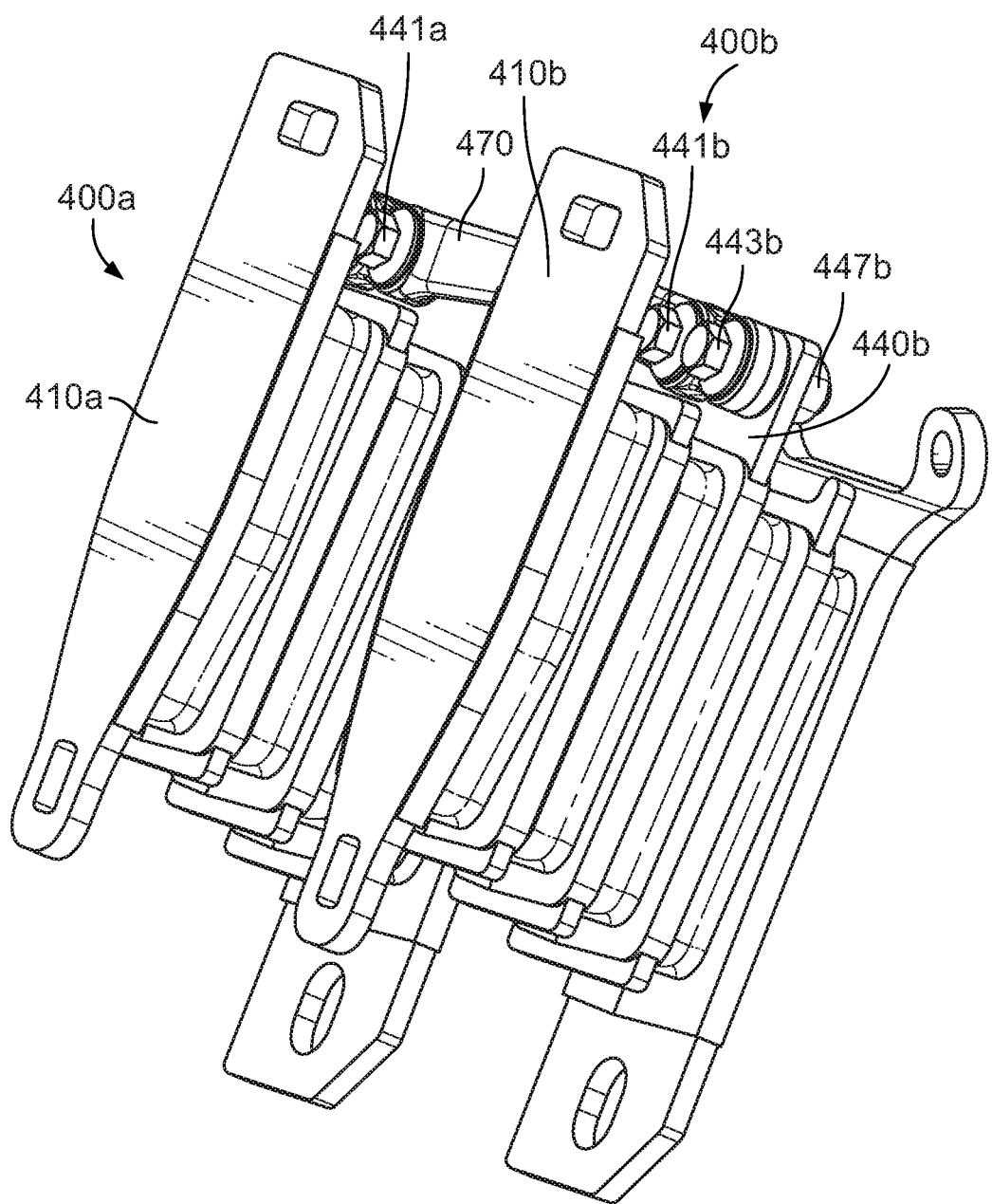
FIG. 36 is another perspective view of a suspension subassembly shown in FIGS. 34 and 35, including bolster springs 400a and 400b.

FIG. 34 is a bottom view of a suspension subassembly including bolster springs 400a and 400b. FIG. 35 is a perspective view of a suspension subassembly including bolster springs 400a and 400b, shown in FIG. 34. FIG. 36 is another perspective view of a suspension subassembly shown in FIGS. 34 and 35, including bolster springs 400a and 400b.

Bolster springs 400a and 400b are secured to each other with tie-bar 470. In particular bolts 441a and 443a are used to secure tie-bar 470 to rearwardly extending flange 440a with nuts 445a and 447a respectively. Similarly, bolts 441b and 443b are used to secure tie-bar 470 to rearwardly extending flange 440b with nuts 445b and 447b. Gap 439 between ears 436 and 438 (shown in FIG. 27) provides clearance for the bolts to connect with the rearwardly extending flange 440a and 440b, respectively.

It will be appreciated that ears 436 and 438 of the suspension subassembly shown in FIGS. 34-36 may be secured to a corresponding suspension subassembly with a common fastener in the same manner as shown in suspension 50 and bolster springs 200.

Figure 37:
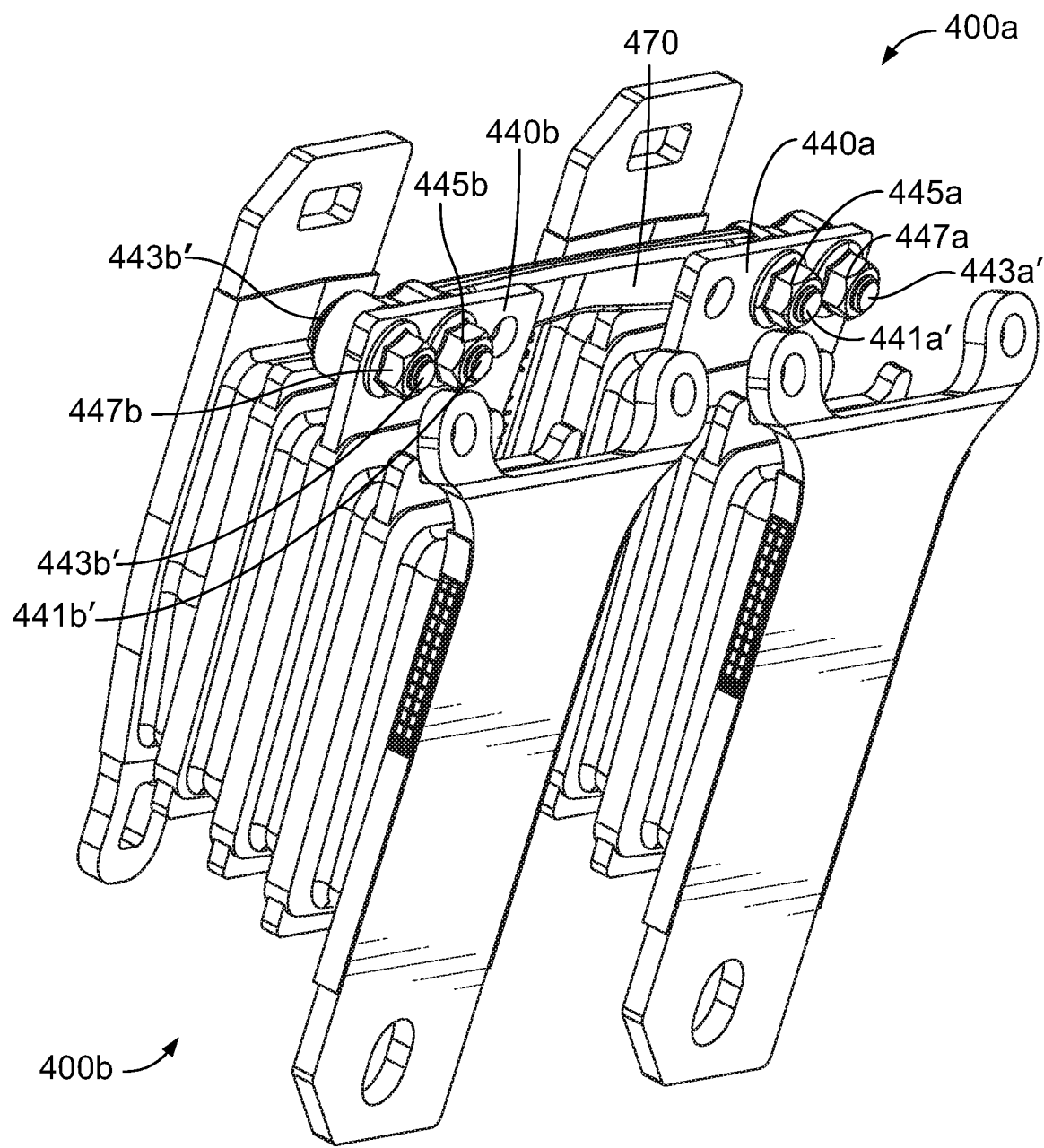
FIG. 37 is a perspective view of a suspension subassembly including bolster springs 400a and 400b.
Figure 38:
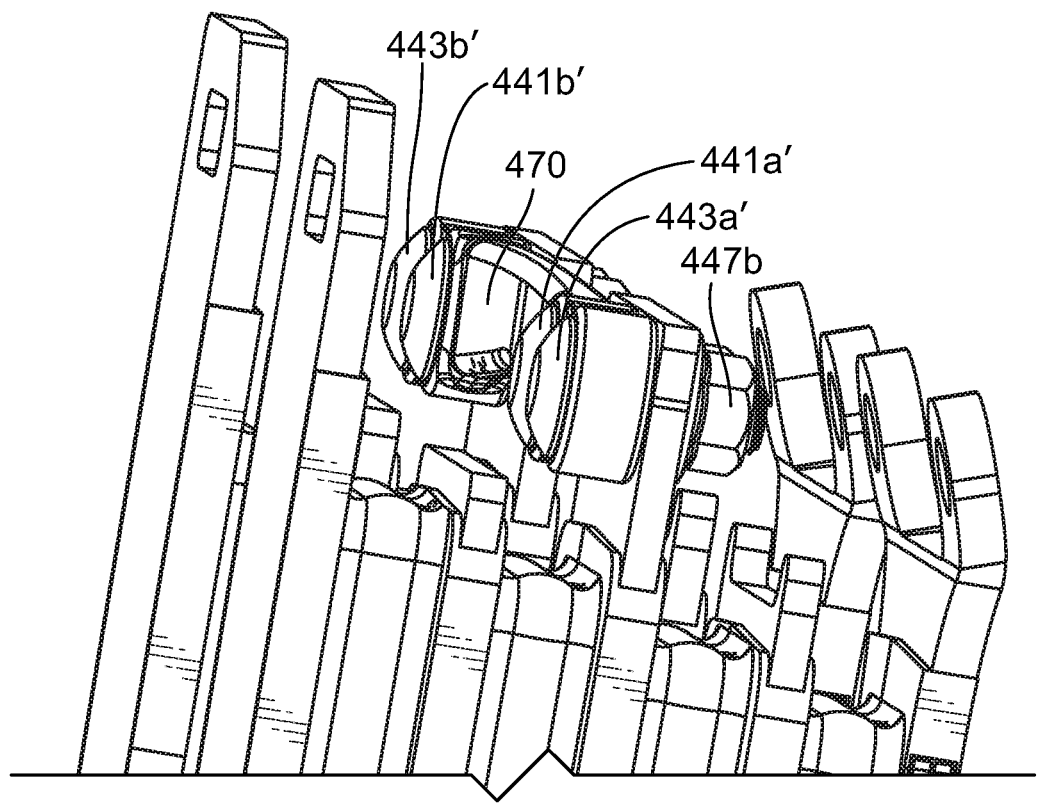
FIG. 38 is another perspective view of a suspension subassembly shown in FIG. 37.
Figure 39:
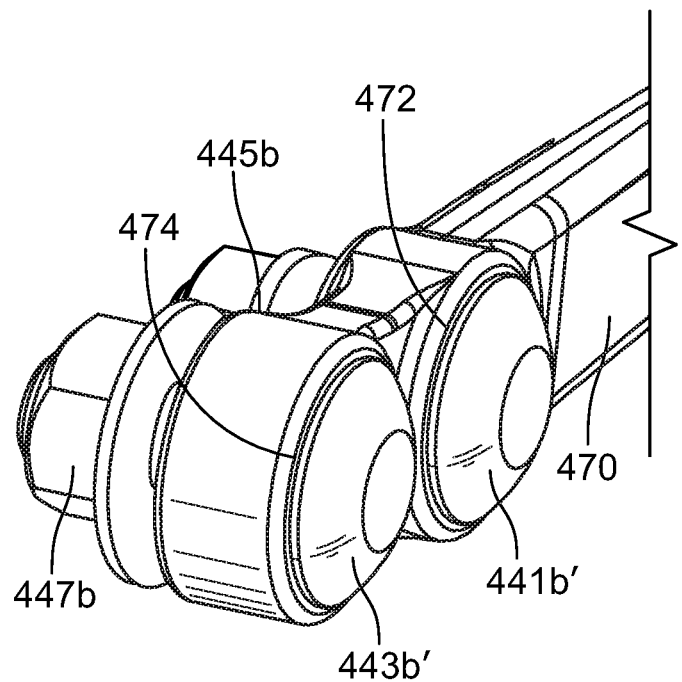
FIG. 39 is a perspective view of tie-bar 470 shown in FIGS. 37 and 38 with fasteners 443b' and 441b'.

FIGS. 37-39 show alternate fasteners 443b' and 441b' that may be used to secure tie-bar 470 to rearwardly extending mounting flange 440b with nuts 447b and 445b, and also alternate fasteners 441a' and 443a' that may be used to secure tie-bar 470 to rearwardly extending mounting flange 440a with nuts 445a and 445b. Fasteners 443b', 441b', 441a', and 443a' differ from fasteners 443b, 441b, 441a, and 443a in that rather than have a nut-shaped head, fasteners 443b', 441b', 441a', and 443a' have a round, low-profile head that is much thinner than the nut-shaped head of fasteners 443b, 441b, 441a, and 443a. As a result, the low-profile head provides for additional clearance to provide for wider articulation angles that may be experienced during operation of a vehicle. The term "low-profile" means that the head has a thickness that is 50% or less than the thickness of a nut shaped head. For example the nut-shaped head on an M12 bolt has a thickness of 12 mm, whereas the low-profile head on an equivalent bolt may have a thickness of 3-6 mm. The head of fasteners 443b', 441b', 441a', and 443a' is shown as round, although it could other shapes, such as square or hexagonal.

Although not required, fasteners 443b' and 441b' may have a stud that is knurled and which may be advantageously press fit into corresponding holes in rearwardly extending mounting flange 440b and a bottom of the low profile head may be drawn into engagement with surfaces 474 and 472 respectively of tie-bar 470 by tightening a nut onto a threaded end of the stud. Fasteners 441a' and 443b' may be configured in the same manner and press fit into corresponding rearwardly extending mounting flange 440a and drawn into engagement with surfaces of tie-bar 470 in the same manner. In other applications, the fasteners 443b', 441b', 441a', and 443a' may not have a knurled surface and may not be press fit into the corresponding mounting holes of rearwardly extending mounting flanges 440b, and 440a.

The current tie-bar setup shown in FIGS. 27-38, with its fastener (rearwardly extending flange 440) that bolts two rate plates together is great for articulation levels up to a certain degree. In high severity applications, the bolster twists to the point where the curl plate itself (shown in bolster spring 200) starts to overcome the preload on the bolt, put the bolt in bending, and stress up the curl plates to where expensive material options would be the only fix (without affected packaging).

With the tie-bar forging with the rearwardly extending flange 440 shown in FIGS. 27-38, the bending stiffness can be tuned in multiple directions so that in severe applications the bar itself stresses up, keeps load out of the bolts, and allows the plates to rotate relative to one another (with the forging bending and/or twisting in between). This increases integrity of the entire joint, as the 1 main bolt moves to 4 separate bolts, distributing load, and the forging stresses up instead of the rate plates.

This has the added benefit of keeping high strength steel rate plates out of the mold, which are harder to use in processing. The forging doesn't need to go in the mold and can be tuned (material and process/design wise) for different applications of the same bolster.

Example embodiments of the present invention have been described above. Those skilled in the art will understand that changes and modifications may be made to the described embodiments without departing from the true scope and spirit of the present invention, which is defined by the claims.

We claim:

1. A bolster spring for vehicle suspension comprising:
a flat base plate;
a top plate;
an intermediate plate positioned between the top plate and the flat base plate;
elastomeric material positioned between the flat base plate and a bottom surface of the intermediate plate, and another elastomeric material positioned between a top surface of the intermediate plate and the top plate;
a first flange comprising a pair of ears having a bottom mounting surface upwardly extending from a first end of the flat base plate at an angle ½α; and
one or more mounting holes positioned in the pair of ears in the first flange adapted for attachment to a pair of ears on an upwardly extending flange on a second bolster spring;
wherein the one or more mounting holes on the pair of ears on the first flange have a gap positioned therebetween; and
wherein the one or more mounting holes on the pair of ears are spaced apart, and wherein a distance between one or more mounting holes on the pair of ears is greater than a width of the flat base plate.

2. The bolster spring of claim 1, wherein a tie-bar mounting flange rearwardly extends from an end of the intermediate plate positioned between the flat base plate and the top plate.

3. The bolster spring of claim 2, wherein the tie-bar mounting flange includes a plurality of mounting holes adapted for attachment to a tie-bar.

4. The bolster spring of claim 3, wherein the tie-bar mounting flange includes three mounting holes adapted for attachment to the tie-bar.

5. The bolster spring of claim 1, wherein the angle ½α is between 15-22.5 degrees.

6. The bolster spring of claim 5, wherein the angle ½α is between 17.5-20 degrees.

7. The bolster spring of claim 6, wherein the angle ½α is 18.5 degrees.

8. The bolster spring of claim 1, wherein when the bottom mounting surface of the pair of ears of the first flange of the bolster spring is positioned against a bottom mounting surface of the pair of ears of the flange of the second bolster spring constructed the same as the bolster spring, an apex angle α of between 30-45 degrees is formed between the bottom mounting surface the bolster spring and the bottom mounting surface of the second bolster spring.

9. A bolster spring for a vehicle suspension comprising:
a flat base plate;
a top plate;
an intermediate plate positioned between the base plate and the top plate elastomeric material positioned between the flat base plate and a bottom surface of the intermediate plate, and another elastomeric material positioned between a top surface of the intermediate plate and the top plate;

a first flange having a bottom mounting surface upwardly extending from a first end of the flat base plate at an angle $\frac{1}{2}\alpha$; and a tie-bar mounting flange of the intermediate plate rearwardly extending from an end of the intermediate plate positioned between the flat base plate and the top plate;

wherein the first flange comprises a pair of ears, wherein one or more mounting holes are positioned in the pair of ears in the first flange adapted for attachment to a pair of ears on an upwardly extending flange on a second bolster spring;

wherein the one or more mounting holes on the pair of ears on the first flange have a gap positioned therebetween; and wherein the one or more mounting holes on the pair of ears are spaced apart, and wherein a distance between the one or more mounting holes on the pair of ears is greater than a width of the base plate.

10. The bolster spring of claim 9, wherein the tie-bar mounting flange includes a plurality of mounting holes adapted for attachment to a tie-bar.

11. The bolster spring of claim 10, wherein the tie-bar mounting flange includes three mounting holes adapted for attachment to the tie-bar.

* * * * *